United States Patent
Hata

(10) Patent No.: US 8,081,240 B2
(45) Date of Patent: Dec. 20, 2011

(54) IMAGING APPARATUS

(75) Inventor: Kazuaki Hata, Osaka (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 420 days.

(21) Appl. No.: 12/399,381

(22) Filed: Mar. 6, 2009

(65) Prior Publication Data

US 2009/0225202 A1 Sep. 10, 2009

(30) Foreign Application Priority Data

Mar. 6, 2008 (JP) ................................. 2008-056319

(51) Int. Cl.
*H04N 5/217* (2006.01)
*H04N 5/228* (2006.01)
*H04N 3/14* (2006.01)

(52) U.S. Cl. ....................... 348/241; 348/221.1; 348/308

(58) Field of Classification Search .. 348/208.7–208.11, 348/345, 222.1, 241, 308
See application file for complete search history.

(56) References Cited

U.S. PATENT DOCUMENTS

2005/0185084 A1* 8/2005 Nonaka et al. ................ 348/345
2005/0248661 A1* 11/2005 Stanvely et al. ......... 348/208.99

OTHER PUBLICATIONS

"Digital Camera; U810 Instruction Manual", OLYMPUS Corp, p. 13.

* cited by examiner

*Primary Examiner* — Mohammed Hasan
(74) *Attorney, Agent, or Firm* — Westerman, Hattori, Daniels & Adrian, LLP

(57) ABSTRACT

An imaging apparatus is provided with an imager for fetching an optical image of an object so as to produce an image signal, a detector for detecting an image blurring amount based on blurring included in the image signal, an image blurring corrector for performing an image-blurring correcting process on the image signal based on the image blurring amount so as to produce a corrected image signal, a first display controller for causing the displayer to display an image based on the image signal, a second display controller for causing a displayer to display an image based on the corrected image signal, and a switcher for switching an image display by the first display controller and an image display by the second display controller.

6 Claims, 17 Drawing Sheets

FIG. 4
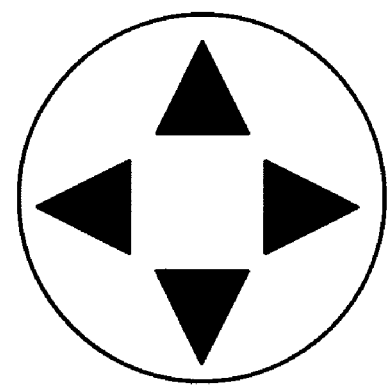
(a)
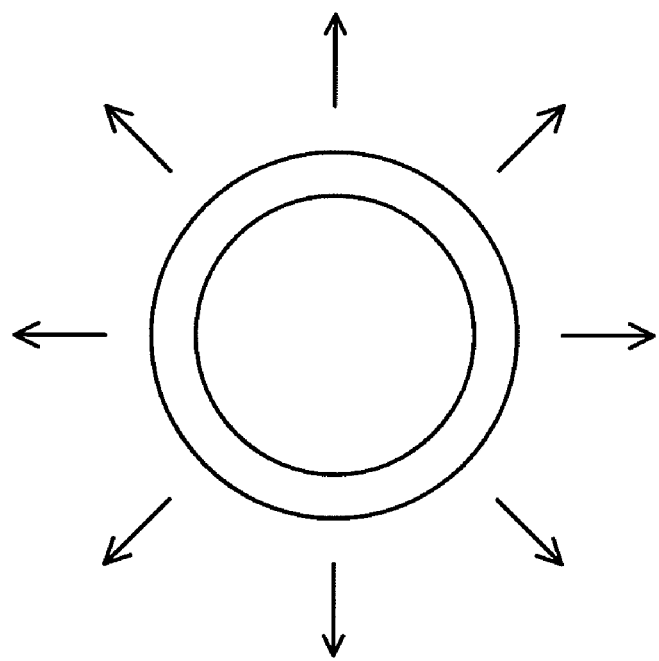
(b)

FIG. 8
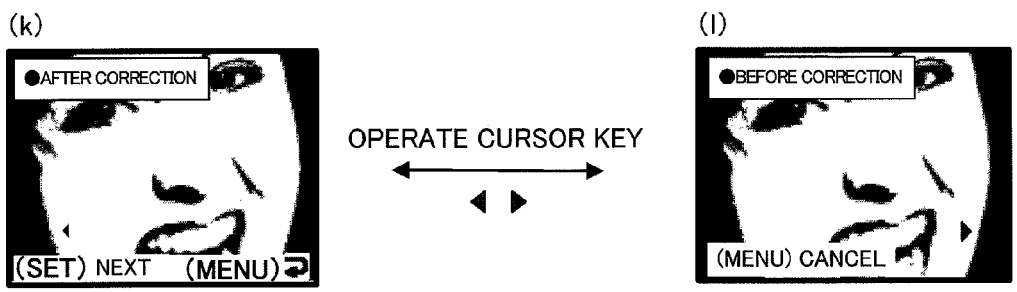
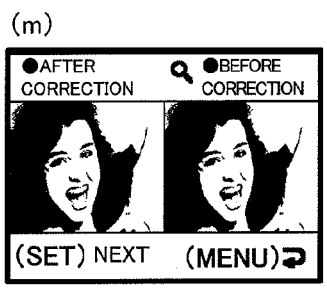
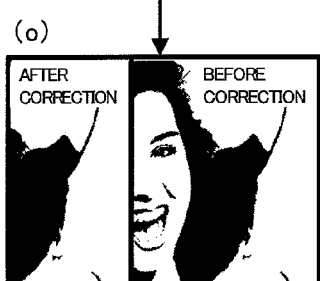
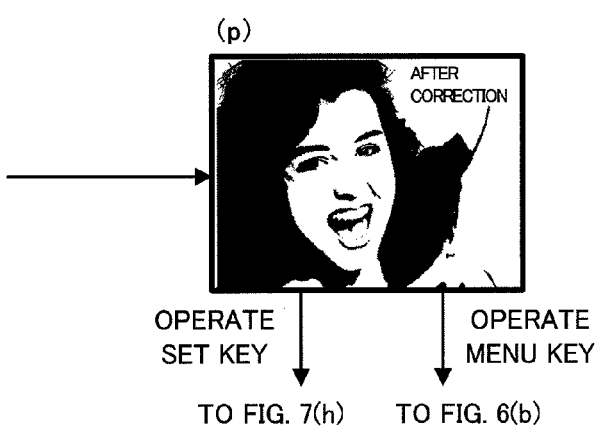
OPERATE SET KEY    OPERATE MENU KEY
TO FIG. 7(h)    TO FIG. 6(b)

IMAGING APPARATUS

CROSS REFERENCE OF RELATED APPLICATION

The disclosure of Japanese Patent Application No. 2008-56319, which was filed on Mar. 6, 2008 is incorporated herein by reference.

BACKGROUND OF INVENTION

1. Field of the Invention

The present invention relates to an imaging apparatus having an image-blurring correcting function.

2. Description of the Related Art

Recent imaging apparatuses, particularly digital cameras, for example, are loaded with a blur-correcting (image-stabilizing) function to reduce a camera shake, which is one example of the causes for image blurring. Examples of blur-correcting techniques for reducing the camera shake, particularly, include a method in which blur-correcting is performed on an image obtained at a time of imaging, and the corrected image on which the blur-correcting has been performed is recorded in an external memory (hereinafter, referred to as a first blur-correcting process), and a method in which images obtained by imaging are once recorded in an external memory, and thereafter, blur-correcting is performed on an image selected by a user from among a plurality of images recorded on the external memory, and the corrected image is recorded again on the external memory (hereinafter referred to as a second blur-correcting process).

In recent years, the number of pixels provided in an imaging device of the digital cameras increases, and when it is attempted to perform the aforementioned first blur-correcting process on the image obtained by imaging by a large number of pixels, a time required from an imaging operation until one frame of image is recorded in the external memory becomes very long. This results in inconvenience for a user who uses the blur-correcting process function so as to image in that it is not possible to perform continuous imaging. In such a case, the second blur-correcting process is effective. For this, recently, digital cameras loaded with this second blur-correcting process function have been sold.

The digital camera that is sold is provided with a blur-correcting button for correcting a camera shake. When the blur-correcting button is depressed in a reproduction mode, the blur-correcting is performed on a camera-shake image displayed on a display when the button is depressed, and this image is recorded as another image (corrected image) on the external memory card. As a result, the camera-shake image on which the blur-correcting is not performed and the corrected image are both mixed and recorded on the external memory card.

By the way, there may be a case that a user desires to recognize how the corrected image recorded on the external memory card is corrected by comparing the camera-shake image before the correction and the corrected image after the correction. However, in the aforementioned digital cameras that are sold, the corrected image is saved as the latest image, and however, the camera-shake image is recorded a few frames prior to the corrected image. Therefore, in order for the user to compare both images, the only option that the user may take is to display the corrected image, and thereafter, forward frame-by-frame so as to display the camera-shake image. Therefore, it is very difficult to compare the both images visually.

SUMMARY OF THE INVENTION

An imaging apparatus according to the present invention, comprises: an imager for fetching an optical image of an object so as to produce an image signal; a detector for detecting an image blurring amount based on blurring included in the image signal; an image blurring corrector for performing an image-blurring correcting process on the image signal based on the image blurring amount so as to produce a corrected image signal; a first display controller for causing a displayer to display an image based on the image signal; a second display controller for causing the displayer to display an image based on the corrected image signal; and a switcher for switching an image display by the first display controller and an image display by the second display controller.

Preferably, the imaging apparatus, further comprises a superposer for superposing a character signal based on the image blurring amount on the image signal.

Preferably, the imaging apparatus, further comprises: a determiner for determining whether or not the image blurring amount exceeds a threshold value; and an image-blurring correction prohibiter for prohibiting the image-blurring correcting process when it is determined in the determiner that the image blurring amount exceeds the threshold value.

More specifically, the imaging apparatus, further comprises a third display controller for causing the displayer to display a warning indicating prohibition of the image-blurring correcting process by the image-blurring correction prohibiter.

Preferably, the imaging apparatus, further comprises: a recorder for recording a plurality of still images, the image signal being corresponding to one frame of the still image; and a selector for selectively selecting one still image from among the plurality of still images, wherein the image-blurring corrector performs the image blurring correction on the still image selected by the selector.

Preferably, the switcher is executed by operation of any one of a plurality of operation keys deployed on a casing including the imager.

More preferably, selection by the selector is performed by operating the operation key based on a selection screen display, and display of a warning signal by the third display controller to the displayer is ended after a predetermined time from a start of the display of the warning signal, and the selection display screen is displayed in the displayer.

Preferably, the imaging apparatus, further comprises: a fourth display controller for causing the displayer to display a first magnified image obtained by performing a magnifying process on the image signal so that a predetermined portion of an image based on the image signal is magnified by a predetermined magnification factor; and a fifth display controller for causing the displayer to display a second magnified image obtained by performing a magnifying process on the corrected image signal so that a portion corresponding to the predetermined portion within an image based on the corrected image signal is magnified by the predetermined magnification factor.

Preferably, the imaging apparatus, further comprises: a memory for recording an image based on the image signal; a first recording controller for overwriting and recording the image based on the corrected image signal over the image based on the image signal recorded in the memory; a second recording controller for recording the image based on the corrected image signal in the memory; and a selector for selecting the first recording controller and the second recording controller.

An imaging apparatus according to the present invention, comprises: an imager for fetching an optical image of an object so as to produce an image signal; a detector for detecting an image blurring amount based on blurring included in the image signal; an image blurring corrector for performing an image-blurring correcting process on the image signal based on the image blurring amount so as to produce a corrected image signal; a first display controller for causing a displayer to display an image based on the image signal; and a slider for sliding the image based on the corrected image signal to the display screen so that a proportion of the image based on the corrected image signal to the image displayed by the first display controller on a display screen in the displayer becomes larger with an elapse of time.

The above described features and advantages of the present invention will become more apparent from the following detailed description of the embodiment when taken in conjunction with the accompanying drawings.

BRIEF DESCRIPTION OF THE DRAWINGS

FIG. 4(a) is an illustrative view showing a shape of a cursor key 130e according to this embodiment;

FIG. 4(b) is an illustrative view showing a shape of a move key 130h according to this embodiment;

FIG. 8 is a transition diagram showing still another part of the screen displayed in the display portion 126 of the digital camera 100 according to this embodiment

DETAILED DESCRIPTION OF THE PREFERRED EMBODIMENTS

Figure 1:
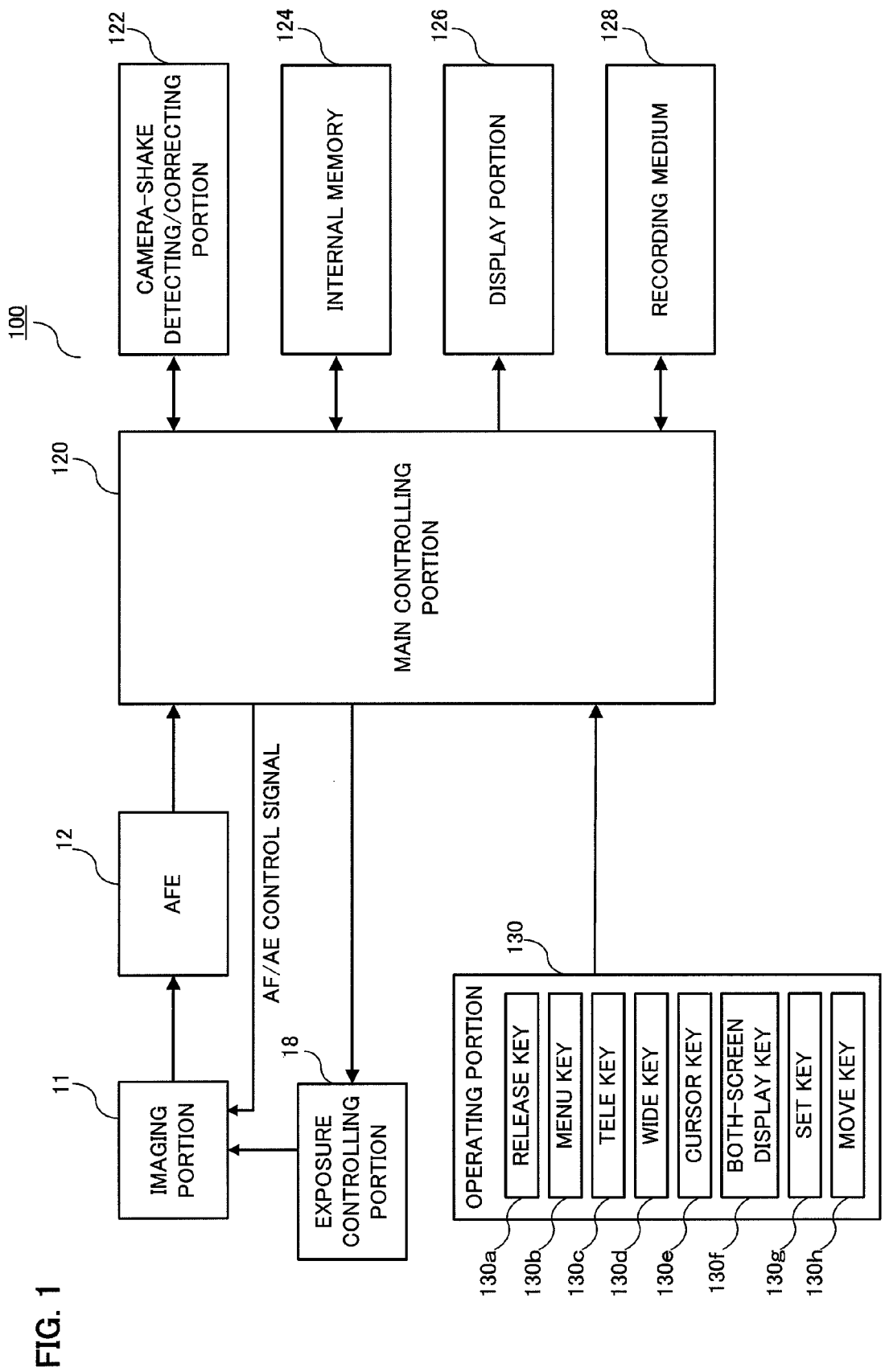
FIG. 1 is a block diagram showing a digital camera 100 according to this embodiment.

Hereinafter, as one embodiment of an imaging apparatus of the present invention, an embodiment in which a digital camera 100 is implemented is specifically described along the drawings. FIG. 1 shows a block diagram of the digital camera 100 of this embodiment.

The digital camera 100 is provided with an imaging portion 11, an AFE 12, an exposure controlling portion 18, a main controlling portion 120, a camera-shake detecting/correcting portion 122, an internal memory 124, a display portion 126, a recording medium 128, and an operating portion 130. The operating portion 130 is provided with a release key 130a, a menu key 130b, a TELE key 130c, a WIDE key 130d, a cursor key 130e, a both-screen display key 130f, a SET key 130g, and a move key 130h.

The imaging portion 11 is provided with an optical system, an aperture, an imaging element such as a CCD (Charge Coupled Device) imager or a CMOS (Complementary Metal Oxide Semiconductor) image sensor, and a driver for controlling an optical system and an aperture. It is noted that these components are not shown. Based on an AF/AE control signal from the main controlling portion 120, the driver controls the optical system and performs an adjustment so that a desired zoom factor or a focal length is achieved, and also controls the opening of the aperture. The imaging element photoelectrically converts an optical image, which represents an object, incident via the optical system and the aperture, and outputs an electrical signal (analog signal) obtained by the photoelectric conversion to the AFE 12.

The AFE 12 amplifies an analog signal outputted from the imaging portion 11, and converts the amplified analog signal into a digital signal. The AFE12 sequentially outputs the digital signal to the main controlling portion 120.

The main controlling portion 120 is provided with a CPU, a ROM, and a RAM, and functions also as a video-signal processing portion. The main controlling portion 120 produces a video signal representing an image photographed by the imaging portion 11 (hereinafter, refereed to as a photographed image) based on the digital signal, which is an output signal of the AFE12. Furthermore, the main controlling portion 120 is also provided with a function that acts as display controlling means for controlling a display content of the display portion 126, and performs necessary control for a display on the display portion 126.

The internal memory 124 is formed by an SDRAM, etc., and temporarily stores various data produced within the digital camera 100. The display portion 126 is a display device formed by a liquid crystal display panel. The recording medium 128 is a non-volatile memory, such as an SD memory card, for recording the photographed image, etc., under the control of the main controlling portion 120.

Furthermore, the main controlling portion 120 is provided with a TELE function of performing a complementary magnifying process in which a part of the photographed image recorded on the recording medium 128 is cut and that part is electrically complementarily magnified, i.e., a digital zoom process, and a WIDE function of performing a digital zoom process by changing a zoom factor in a direction in which the magnified photographed image on which the digital zoom process is performed is restored to the original photographed image.

The operating portion 130 receives an operation from outside. The operation content for the operating portion 130 is transmitted to the main controlling portion 120. The release key 130a is a key for instructing to photograph and record a still image. The menu key 130b is a key for instructing to display a plurality of items in the display portion 126 so that a user is allowed to select the items. The TELE key 130c is a key for instructing to perform the digital zoom process on the photographed image recorded on the recording medium 128. The WIDE key 130d is a key for instructing to perform the digital zoom process by changing the zoom factor in a direction in which the magnified photographed image on which the digital zoom process is performed is restored to the original photographed image. Furthermore, the cursor key 130e is a circular key as shown in the FIG. 4(a). When the cursor key 130e is depressed in up, down, left and right directions, it becomes possible to select the plurality of items displayed in the display portion 126. The both-screen display key 130f is a key for instructing to display, side-by-side, one frame of photographed image (described later) and one frame of corrected photographed image on which a predetermined correcting process is performed, on one screen of the display portion 126. The SET key 130g is a key for instructing and determining the item selected by the aforementioned cursor key 130e. As shown in the FIG. 4(b), the move key 130h is a circular key projecting in a vertical direction with respect to a plane surface of a casing of the digital camera 100. Also, the move key 130h is a key for changing a magnification center portion of the magnified image displayed in the display portion 130 described later when the move key 130h is pushed and depressed in not only up, down, left, and right directions, but also in an oblique direction.

The exposure controlling portion 18 controls an exposure time of each pixel of the imaging element so that an exposure amount of the imaging element of the imaging portion 11 is made optimize. When an exposure-time control signal is applied from the main controlling portion 120 to the exposure controlling portion 18, the exposure controlling portion 18 controls the exposure time according to that exposure-time control signal.

An operation mode of the digital camera 100 includes a photography mode that enables photographing and recording a still image or a moving image, and a reproduction mode in which the still image or the moving image recorded on the recording medium 128 is reproduced and displayed in the display portion 126. Transition between each mode is implemented according to the operation performed on the operating portion 130.

In the photography mode, the imaging portion 11 sequentially photographs according to a predetermined frame cycle (1/60 seconds, for example). The main controlling portion 120 produces an image for a through display from output of the imaging portion 11 in each frame, and sequentially updates and displays the image for a through display, which is obtained sequentially, in the display portion 126.

In the photography mode, when the release key 130a is operated, the main controlling portion 120 accommodates (i.e., stores) image data representing a single photographed image on the recording medium 128 and in the internal memory 124. This photographed image is an image that may include blurring caused due to a camera shake, and is corrected by the camera-shake detecting/correcting portion 122 according to a correction instruction applied via the operating portion 130, etc., in the reproduction mode, in a later stage. Therefore, the aforementioned single photographed image along with the operation of the release key 130a is particularly called an "image subject to correction".

The camera-shake detecting/correcting portion 122 detects blurring included in the image subject to correction based on the image data obtained from the output signal of the imaging portion 11 without using a camera-shake detecting sensor, such as an angular speed sensor, and corrects the image subject to correction according to the detection result so as to produce a correction-processed image from which the blurring is removed or reduced.

By the way, the blur-correcting process performed in the aforementioned camera-shake detecting/correcting portion 122 is achieved by using a method shown in Japanese Patent Application No. 2007-300222, "Blurring Detecting Apparatus, Blurring Correcting Apparatus, and Method therefor" (hereinafter, referred to as prior application A), which was filed on Nov. 20, 2007, by the applicant of the present application. It is noted that the blur-correcting process may be called as image-stabilizing process. This blur-correcting process is a process using an Iterative Fourier method in which from one piece of a camera-shake image that is obtained by photographing and includes blurring, camera shake information (a point spread function or an image restoration filter) representing camera shake during the photography is assumed, and from the camera shake information and the camera-shake image, a restored image without the blurring is produced by a digital signal process. This process is configured by a block shown in FIG. 14, and the prior application A provides the detailed description. Hereinafter, a part of the processes set forth in the prior application A is described.

Figure 14:
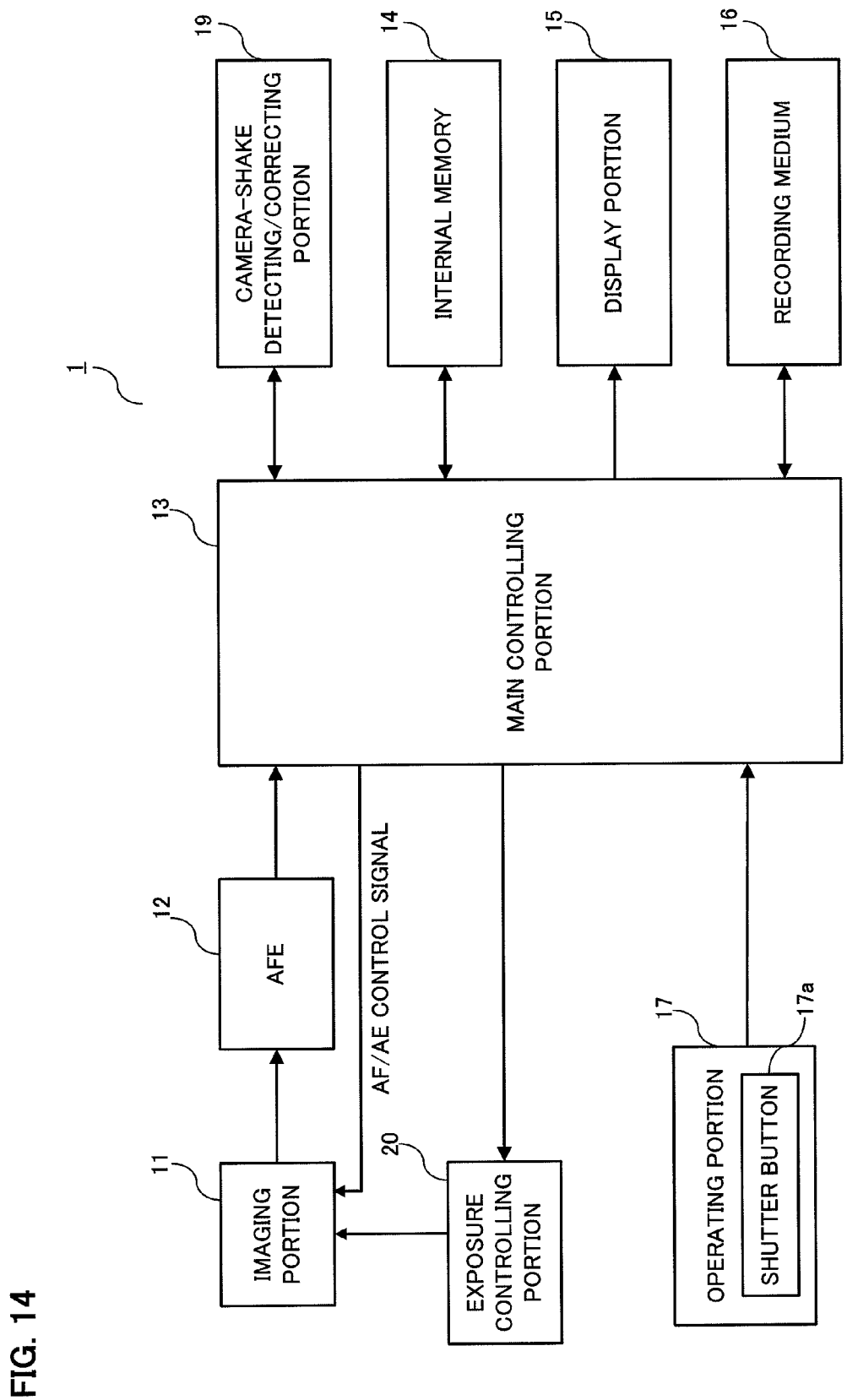
FIG. 14 is a block diagram showing an imaging apparatus 1 of a prior application A adapted to the digital camera 100 according to this embodiment.

FIG. 14 is an overall block diagram of an imaging apparatus 1 according to a first embodiment of the prior application A. The imaging apparatus 1 in FIG. 14 is a digital still camera capable of photographing and recording a still image or a digital video camera capable of photographing and recording the still image and a moving image. The imaging apparatus 1 is provided with an imaging portion 11, an AFE 12, a main controlling portion 13, an internal memory 14, a display portion 15, a recording medium 16, an operating portion 17, an exposure controlling portion 20, and a camera-shake detecting/correcting portion 19. The opening portion 17 is provided with a shutter button 17a.

The imaging portion 11 includes an optical system, an aperture, an imaging element made of a CCD or CMOS image sensor, etc., and a driver for controlling the optical system and the aperture (all of these not shown). The driver controls a focus condition and opening of the aperture based on an AF/AE control signal from the main controlling portion 13. The imaging element photoelectrically converts an optical image representing an object incident via the optical system and the aperture, and outputs an electrical signal obtained by the photoelectric conversion to the AFE 12.

The AFE 12 amplifies an analog signal outputted from the imaging portion 11 (imaging element), and converts the amplified analog signal to a digital signal. The AFE 12 sequentially outputs the digital signal to the main controlling portion 13.

The main controlling portion 13 is provided with a CPU, a ROM, and a RAM, etc., and also functions as a video-signal processing portion. The main controlling portion 13 produces a video signal representing an image photographed by the imaging portion 11 (hereinafter referred to as a "photographed image") based on an output signal of the AFE 12. Furthermore, the main controlling portion 13 is also provided with a function as display controlling means for controlling a display content of the display portion 15, and performs control necessary for a display on the display portion 15.

The internal memory 14 is formed by an SDRAM, etc., and temporarily stores various data produced within the imaging apparatus 1. The display portion 15 is a display device formed by a liquid crystal display panel, etc., and displays an image photographed in an immediately previous frame and an image recorded on the recording medium 16, under the control of the main controlling portion 13. The recording medium 16 is a non-volatile memory, such as an SD memory card, for storing the photographed image, etc., under the control of the main controlling portion 13.

The operating portion 17 receives an operation from outside. An operation content for the operating portion 17 is transmitted to the main controlling portion 13. A shutter button 17a is a button for instructing to photograph and record the still image.

The exposure controlling portion 20 controls an exposure time of each pixel of the imaging element so that an exposure amount of the imaging element of the imaging portion 11 is optimized. When an exposure-time control signal is applied from the main controlling portion 13 to the exposure controlling portion 20, the exposure controlling portion 20 controls the exposure time according to that exposure-time control signal.

Operation modes of the imaging apparatus 1 include a photography mode capable of photographing and recording a still image or a moving image, and a reproduction mode in which the still image or the moving image recorded on the recording medium 16 is reproduced and displayed in the display portion 15. Transition between each mode is implemented according to the operation performed on the operating portion 17.

In the photography mode, the imaging portion 11 sequentially photographs according to a predetermined frame cycle (for example, 1/60 seconds). The main controlling portion 13 produces an image for a through display from output of the imaging portion 11 in each frame, and sequentially updates and displays the image for a through display, which is obtained sequentially, in the display portion 15.

In the photography mode, when a shutter button 17a is depressed, the main controlling portion 13 accommodates (i.e., stores) image data representing a single photographed image on the recording medium 16 and in the internal memory 14. This photographed image is an image that may contain blurring caused due to a camera shake, and is later corrected according to a correction instruction applied via the operating portion 17, etc., or corrected automatically by the camera-shake detecting/correcting portion 19. Therefore, hereinafter, the aforementioned single photographed image along with the depressing of the shutter button 17a is particularly called an "image subject to correction". Furthermore, because the blurring included in the image subject to correction is detected by the camera-shake detecting/correcting portion 19, the image subject to correction may also be paraphrased as an "image subject to detection".

The camera-shake detecting/correcting portion 19 detects blurring included in the image subject to correction based on the image data obtained from the output signal of the imaging portion 11 without using a camera-shake detecting sensor, such as an angular speed sensor, and corrects the image subject to correction according to the detection result so as to produce a corrected image from which the blurring is removed or reduced.

Figure 15:
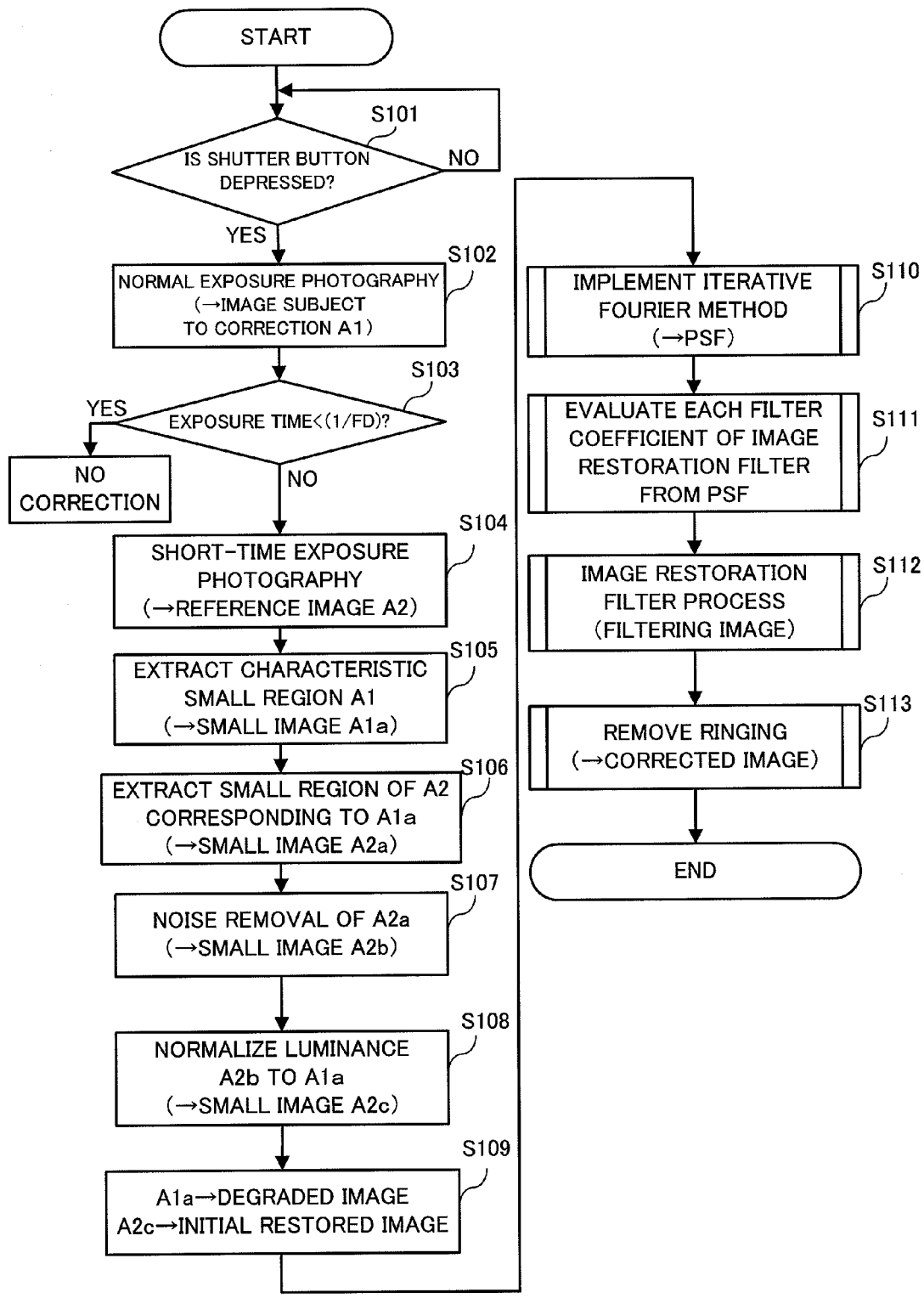
FIG. 15 is a flowchart showing a part of a procedure of a blur-correcting process of the imaging apparatus 1 of the prior application 1 adapted to the digital camera 100 according to this embodiment.
Figure 16:
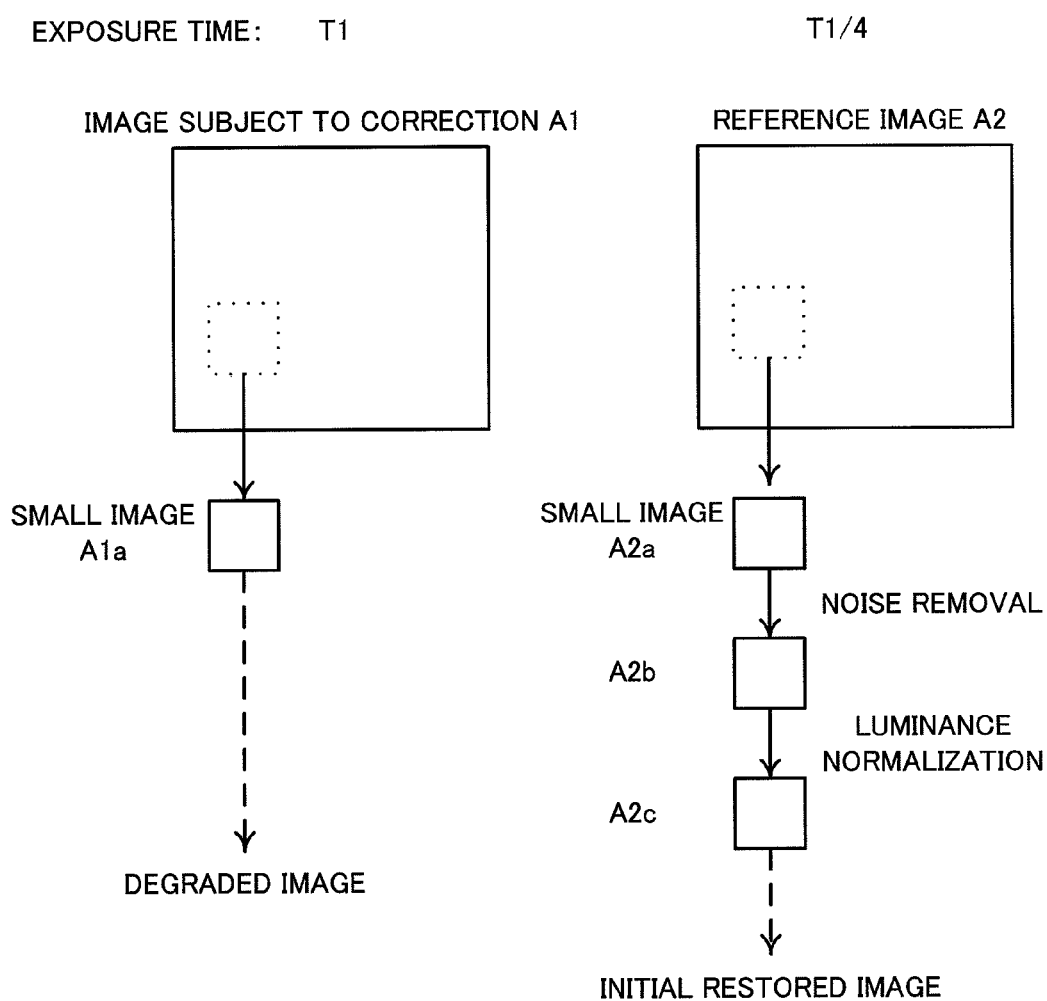
FIG. 16 is a conceptual diagram representing apart of a flow of an operation of FIG. 15.

Hereinafter, an embodiment for providing a detailed description of a function of the camera-shake detecting/correcting portion 19 is given. The description is provided with reference to FIG. 15 and FIG. 16. FIG. 15 is a flowchart representing a flow of operations of camera-shake detection and blur-correcting. FIG. 16 is a conceptual diagram representing a part of the flow of this operation. This flow of the operation is described along the flowchart in FIG. 15.

In the photography mode, when the shutter button 17a is depressed, a normal exposure photography is performed, and the image subject to correction thus generated is stored on the internal memory 14 (steps S101 and S102). Hereinafter the image subject to correction is called an image subject to correction A1.

Next, in a step S103, an exposure time T1 when obtaining the image subject to correction A1 are compared with a threshold value $T_{TH}$, and when the exposure time T1 is smaller than the threshold value $T_{TH}$, the process in FIG. 15 is ended without performing the blur-correcting, regarding that the image subject to correction A1 does not include the blurring originating from the camera shake (or includes very minute shake). As the threshold value $T_{TH}$, a camera-shake limit exposure time is used, for example. The camera-shake limit exposure time is a limit exposure time in which the camera shake is determined as negligible, and is calculated from an inverse number of the focal length $f_D$.

When the exposure time T1 is larger than the threshold value $T_{TH}$, the process moves to a step S104 so as to perform a short-time exposure photography subsequent to a normal exposure photography, and stores the photographed image obtained by this short-time exposure photography on the internal memory 14 as a reference image. Hereinafter, the reference image is referred to as a reference image A2. The image subject to correction A1 and the reference image A2 are obtained by continuous photography (i.e., these images are obtained in the adjacent frames). In this case, the main controlling portion 13 controls the exposure controlling portion 20 in FIG. 14 such that the exposure time at the time of obtaining the reference image A2 is shorter than the exposure time T1. For example, the exposure time of the reference image A2 is T1/4. Furthermore, the image subject to correction A1 and the reference image A2 are the same in image size.

Next, in the step S105, a characteristic small region is extracted from the image subject to correction A1, and an image within this extracted small region is stored on the internal memory 14 as a small image A1a. The characteristic small region indicates, out of the extraction source image, a rectangular region with relatively many edge components (in other words, the contrast is relatively strong), and a small region of 128×128 pixels is extracted as the characteristic small region by using a Harris corner detector, for example. Thus, the characteristic small region is selected based on the size of the edge components (or a contrast amount) of the image within the small region.

Next, in a step S106, a small region having the same coordinates as those in the small region extracted from the image subject to correction A1 is extracted from the reference image A2, and the image within this small region extracted from the reference image A2 is stored on the internal memory 14 as a small image A2a. Central coordinates of the small region extracted from the image subject to correction A1 (central coordinates of the image subject to correction A1) and those of the small region extracted from the reference image A2 (central coordinates of the reference image A2) are equal, and also, the image subject to correction A1 and the reference image A2 are equal in image size. Therefore, the image sizes of the both small regions also are equal.

The exposure time of the reference image A2 is relatively shorter, and therefore, a signal-to-noise ratio (hereinafter, referred to as an S/N ratio) of the small image A2a is relatively low Thus, the noise removal process is performed on the small image A2a in a step S107. The small image A2a after the noise removal is called a small image A2b. Noise removal is performed by filtering the small image A2a using a linear filter (a weighted average filter, etc.) or a nonlinear filter (a median filter, etc).

Because the small image A2b has low luminance, a luminance level of the small image A2b is increased in a step S108. In other words, for example, a luminance normal on process in which a luminance value of each pixel of the small image A2b is multiplied by a constant value is performed so that a luminance level of the small image A2b is equal to that of the small image A1a (so that an average luminance of the small image A2b becomes equal to that of the small image A1a). The small image A2b in which the luminance level is increased in this manner is called a small image A2c.

The small image A1a obtained as described above is handled as a degraded image and the small image A2c is handled as an initial restored image (step S109), and then in a step S110, an Iterative Fourier method is implemented so as to evaluate an image degradation function.

When the Iterative Fourier method is implemented, a restored image at an initial stage (initial value of a restored image) needs to be applied, and therefore, this restored image at an initial stage is called an initial restored image.

A Point Spread Function (hereinafter, referred to as PSF) is evaluated as the image degradation function. An operator or a space filter in which an ideal point image is weighed to match a trajectory rendered on an image by the blurring of the imaging apparatus 1 is called PSF. The PSF is generally used as a mathematical model for camera shake. The camera shake applies degradation uniformly on the entire image, and thus, the PSF evaluated for the small region A1a can be utilized as a PSF for the entire image subject to connection A1.

The Iterative Fourier method is a technique for obtaining a restored image obtained by removing or reducing the degradation from a degraded image including degradation. This technique is disclosed in a reference "G. R. Ayers and J. C. Daninty, "Iterative blind deconvolution method and its applications", OPTICS LETTERS, 1998, Vol. 13, No. 7, p. 547 to 549".

Figure 2:
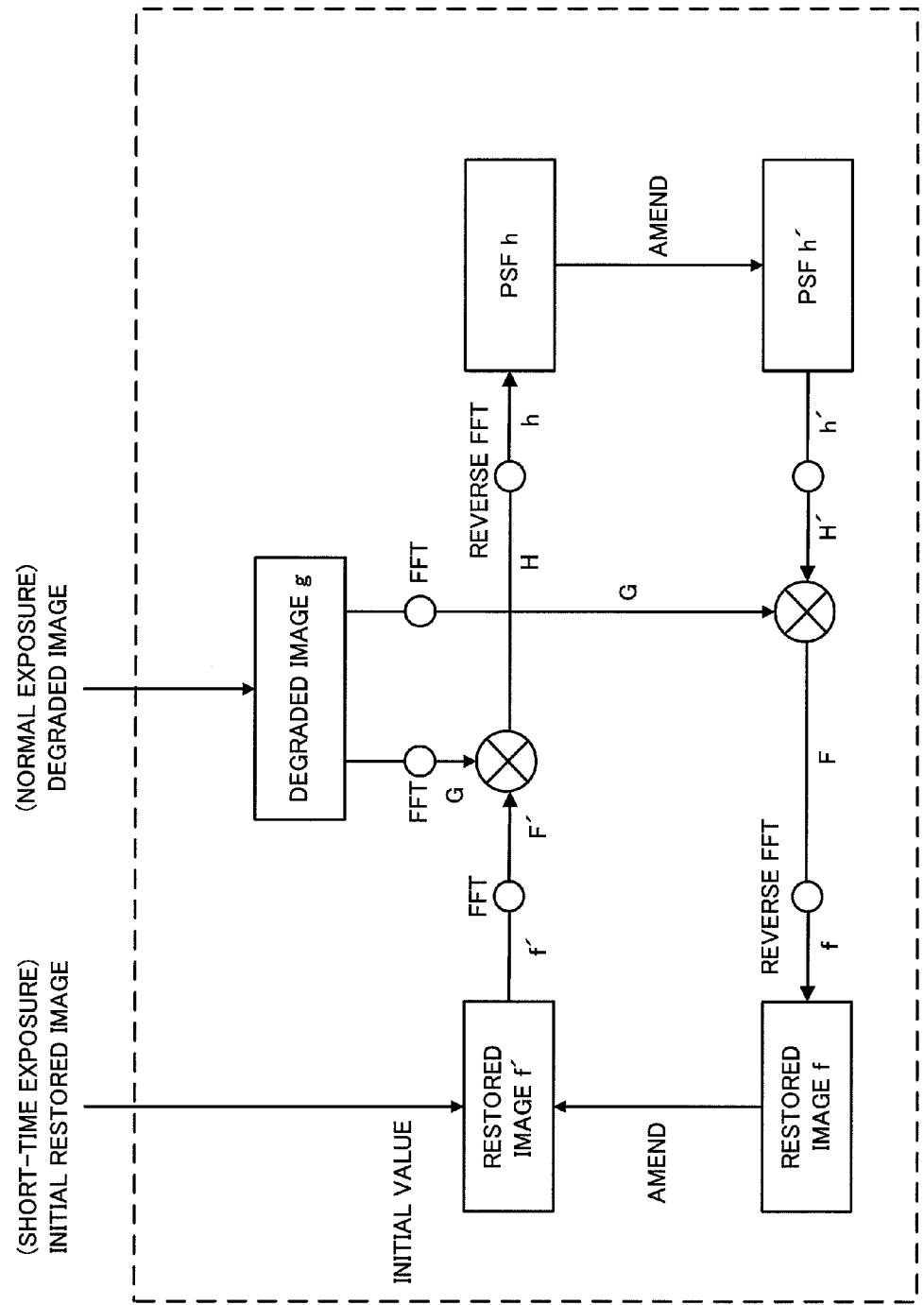
FIG. 2 is a block diagram of a configuration for realizing an Iterative Fourier method in the digital camera 100 according to this embodiment.
Figure 17:
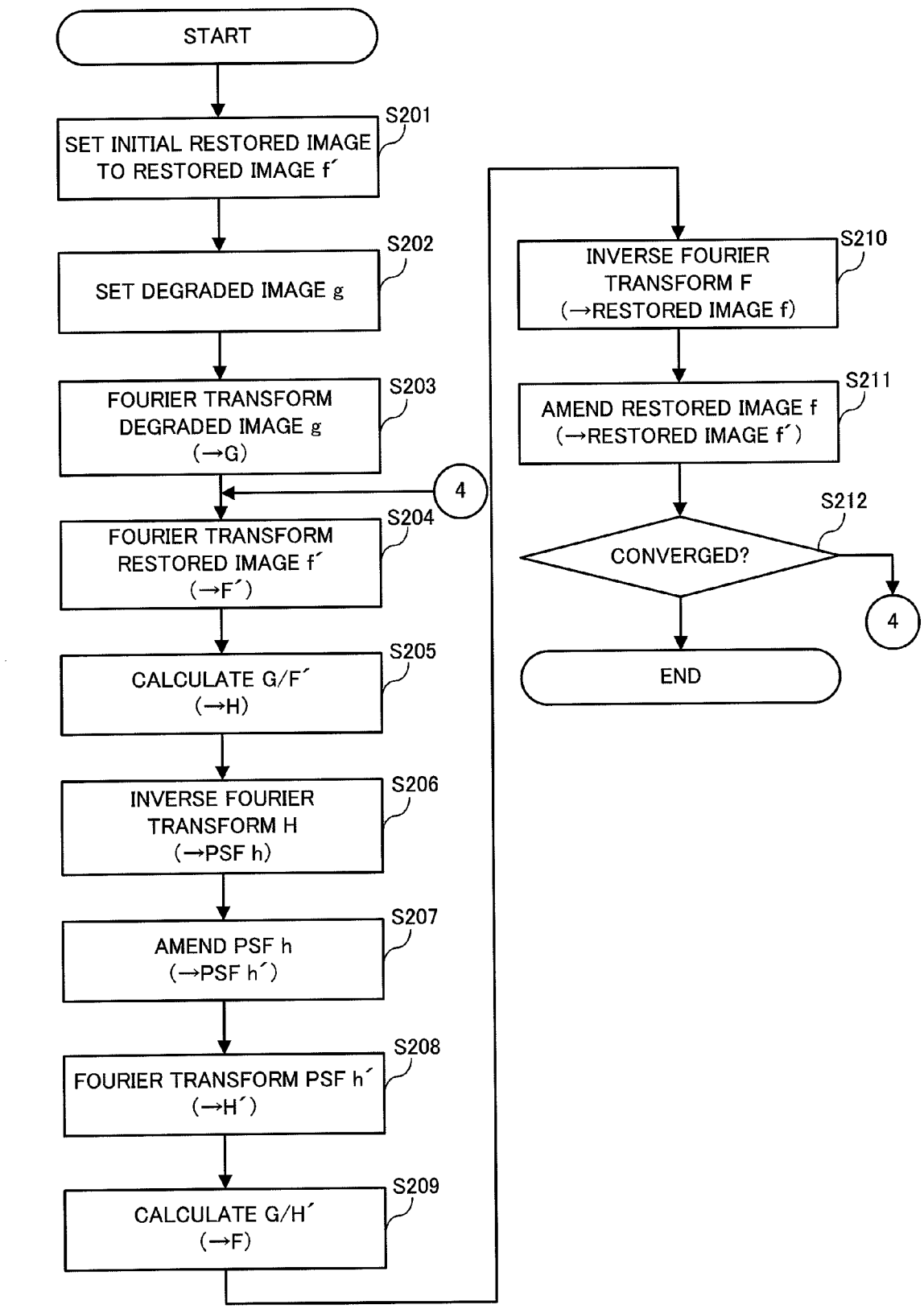
FIG. 17 is a flowchart showing another part of the procedure of the blur-correcting process of the imaging apparatus 1 of the prior application A adapted to the digital camera 100 according to this embodiment.

This Iterative Fourier method is described in detail with reference to FIG. 2 and FIG. 17. FIG. 17 is a detailed flowchart of the process in the step S110 in FIG. 15. FIG. 2 is a block diagram of a site in which the Iterative Fourier method is implemented.

Firstly, in a step S201, are stored image is set to f', and the initial restored image is set to this restored image f'. That is, the aforementioned initial restored image (small image A2c) is used as the initial restored image f'. Next, in a step S202, a degraded image (small image A1a) is set to g. Thus, the degraded image g is Fourier transformed, and the resultant image is set to G, which is stored on the internal memory 14 (step S203). For example, when the image sizes of the initial restored image and the degraded image are 128×128 pixels, f' and g may be expressed as a matrix having a matrix size 128×128.

Next, in a step S204, F' obtained by Fourier transforming the restored image f' is evaluated, and further, in a step S205, H is calculated by the following Equation (1). H is equivalent to a value obtained by Fourier transforming the PSF. In Equation (1), F'* denotes a conjugate complex matrix of F', and α denotes a constant.

$$H = \frac{G \cdot F'^*}{|F'| + \alpha} \quad (1)$$

Next, in a step S206, H is inverse Fourier transformed so that PSF is obtained. The PSF thus obtained is regarded as h. Next, in a step S207, PSF h is amended under a restraint condition of the following Equation (2a), and is again amended under a restraint condition of Equation (2b).

$$h(x, y) = \begin{cases} 1 & : h(x, y) > 1 \\ h(x, y) & : 0 \leq h(x, y) \leq 1 \\ 0 & : h(x, y) < 0 \end{cases} \quad (2a)$$

$$\Sigma h(x, y) = 1 \quad (2b)$$

PSF h is expressed as a two-dimensional matrix, and therefore, each element of this matrix is represented by h (x, y). Each element of PSF should fundamentally have a value equal to or more than 0 and equal to or less than 1. Thus, in the step S207, it is determined whether each element of PSF is equal to or more than 0 and equal to or less than 1, and while values of the elements that are equal to or more than 0 and equal to or less than 1 are maintained as such, when there are elements more than 1, the value of that element is amended to 1, and when there are elements smaller than 0, the value of that element is amended to 0. This is the amendment under the restraint condition of Equation (2a). Thus, the PSF is normalized such that a sum total of each element of PSF after the amendment becomes 1. This normalization is the amendment under the restraint condition of Equation (2b).

The PSF amended under the restraint conditions of Equations (2a) and (2b) is regarded as h'.

Next, in a step S208, H' that is obtained by Fourier transforming PSF h' is evaluated, and further, in a step S209, F is calculated from the following Equation (3). F is equivalent to a value obtained by Fourier transforming the restored image f. In Equation (3), H'* denotes a conjugate complex matrix of H', and β denotes a constant.

$$F = \frac{G \cdot H'^*}{|H'|^2 + \beta} \quad (3)$$

Next, in a step S210, F is inverse Fourier transformed, and thereby, the restored image is obtained. The restored image obtained in this step is called f. Next, in a step S211, the restored image f is amended under the restraint condition of the following Equation (4), and the amended restored image is newly called f'.

$$f(x, y) = \begin{cases} 255 & : f(x, y) > 255 \\ f(x, y) & : 0 \leq f(x, y) \leq 255 \\ 0 & : f(x, y) < 0 \end{cases} \quad (4)$$

The restored image f is expressed as a two-dimensional matrix, and therefore, each element of this matrix is represented by f(x, y). Now, a pixel value of each pixel of the degraded image and the restored image is represented by digital values from 0 to 255. Thus, each element (i.e., each pixel value) of the matrix representing the restored image f should fundamentally have a value equal to or more than 0 and equal to or less than 255. Therefore, in a step S211, it is determined whether each element of the matrix representing the restored image f is equal to or more than 0 and equal to or less than 255, and while values of the elements that are equal to or more than 0 and equal to or less than 255 are maintained as such, when there are elements more than 255, the value of that element is amended to 255, and when there are elements smaller than 0, the value of that element is amended to 0. This is the amendment under the restraint condition of Equation (4).

Next, in a step S212, a convergence determination of an iterative process is performed by determining whether or not a convergence condition is satisfied.

For example, an absolute value of a difference between the latest F' and F' obtained one before is used as an index for determining the convergence. When this index is equal to or less than a predetermined threshold value, it is determined that the convergence condition is satisfied, and otherwise, it is determined that the convergence condition is not satisfied.

When the convergence condition is satisfied, a value obtained by inverse Fourier transforming the latest H' is regarded as a final PSF. That is, the value obtained by inverse Fourier transforming the latest H' is the PSF that needs to be evaluated in the step S110 in FIG. 15. When the convergence condition is not satisfied, the process returns to the step S204 so as to repeat each of the processes in the steps S204 to S212. In the repetition of each process in the steps S204 to S212, f', F', H, h, h', H', F, and f (see FIG. 2) are sequentially updated to the latest values.

As the index for a convergence determination, another index may be used. For example, an absolute value of a difference between the latest H' and H' obtained one before may be used as the index for the convergence determination. In this way, it may be possible to determine whether or not the aforementioned convergence condition is satisfied. Further, an amending amount in the step S207 where the aforementioned Equations (2a) and (2b) are used, or an amending amount in the step S211 where Equation (4) is used may be used as the index for the convergence determination, thereby determining whether or not the aforementioned convergence condition is satisfied. The reason for that is that when the iterative process is gradually converged, the amending amounts become smaller.

Furthermore, when the number of times of repetition of a loop process made of the steps S204 to S212 reaches a predetermined number of times, the process may be ended without calculating the final PSF, determining that the convergence is not possible. In this case, the correction of the image subject to correction is not performed.

Now, the description of each step in FIG. 15 is resumed. After calculating the PSF in the step S110, the process moves to a step S111. In the step S111, each element of the reverse matrix of the PSF evaluated in the step S110 is evaluated as each filter coefficient of an image restoration filter. This image restoration filter is a filter for obtaining the restored image from the degraded image. Actually, each element of the matrix represented in the following Equation (5) that is equivalent to a part of a right side of the aforementioned Equation (3) is equivalent to each filter coefficient of the image restoration filter, and therefore, intermediate calculation results of the Iterative Fourier method in the step S110 can be used as it is. However, H'* and H' in Equation (5) are H'* and H' obtained immediately before the convergence condition in the step S212 is satisfied (i.e., the finally obtained H'* and H').

$$\frac{\cdot H'^*}{|H'|^2 + \beta} \quad (5)$$

After evaluating each filter coefficient of the image restoration filter in the step S111, the process moves to a step S112 so as to produce a filtering image from which the blurring included in the image subject to correction A1 is removed or reduced, by filtering the image subject to correction A1 using this image restoration filter. The filtering image may include ringing that accompanies filtering, and thus, when the ringing is removed in a step S113, the final corrected image is produced.

Blocks assigned with the same reference numerals as those shown in the preceding FIG. 14 and those in FIG. 1 shown in this embodiment have functions similar to those shown in the aforementioned prior application A. Blocks to which the same block names are assigned have slightly different functions. Furthermore, this embodiment adapts the blur-correcting process in the aforementioned prior application A. Different functions are described in detail, below.

FIG. 2 shows a block diagram of a site in which the Iterative Fourier method is implemented according to this embodiment, which has functions similar to those described by using FIG. 2 in the aforementioned prior application A.

Figure 3:
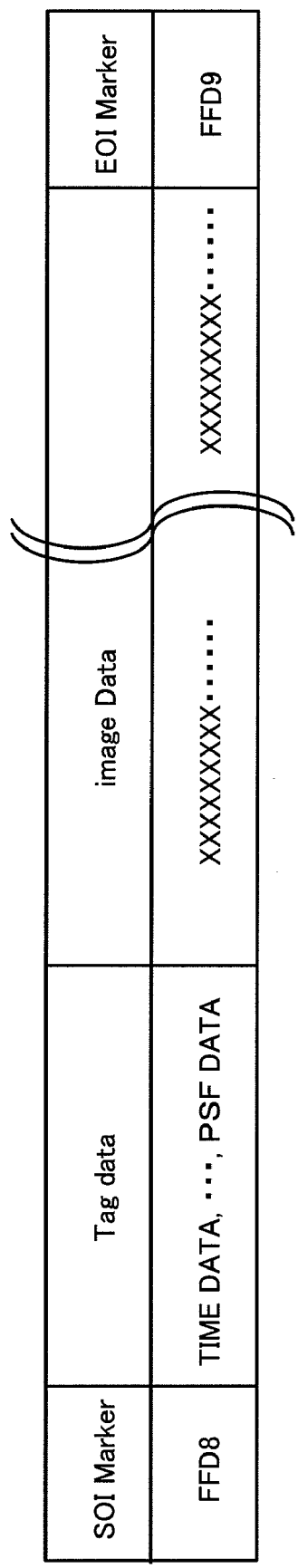
FIG. 3 is an illustrative view showing a structure of data recorded on a recording medium 128 according to this embodiment.

In a digital camera 100 of this embodiment, instead of performing a series of blur-correcting processes of the aforementioned prior application A on the image subject to correction in the photography mode, a blur-correcting process is performed on the image subject to correction in the reproduction mode. Therefore, in this embodiment, the processes from the detection of depressing of the shutter button in the photography mode of the aforementioned prior application A onward until the calculation of the PSF (procedures from the step S101 to the step S110 described in FIG. 15) are performed at a time of photography, and the PSF data and the image subject to correction are correlated and recorded on the recording medium 128. Specifically, the image subject to correction is recorded on the recording medium 128 as one frame of image data in an exif format as shown in FIG. 3, and therefore, the PSF data is recorded in a tag data areas. The processes until this time are regarded as a blur-correcting process A.

Next, in the reproduction mode, when image data recorded on a recording medium 128 in an exif form is read out, a reproduced image is displayed in the display portion 126. In this reproduction mode, based on a blur-correcting instruction from the operating portion 130, a process obtained by removing the blur-correcting process A from a series of the aforementioned blur-correcting processes (procedures corresponding to the step S111 to the step S113 described in FIG. 15, which is hereinafter referred to as a blur-correcting process B) is performed on the image data, and thereby, a correction-processed image is produced.

Hereinafter, the blur-correcting process B in the reproduction mode is described.

Figure 5:
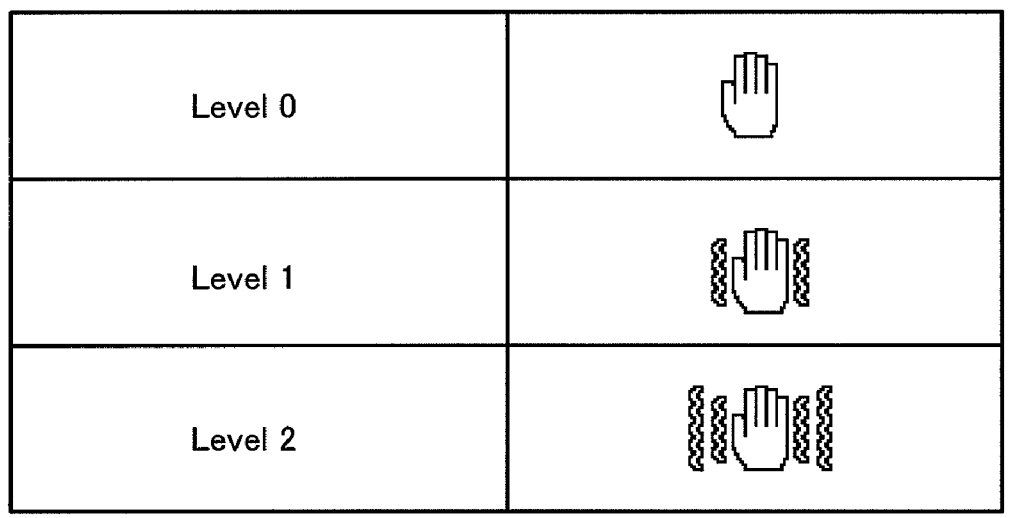
FIG. 5 is an illustrative view showing a relationship between a camera shake level and an icon according to this embodiment.
Figure 6:
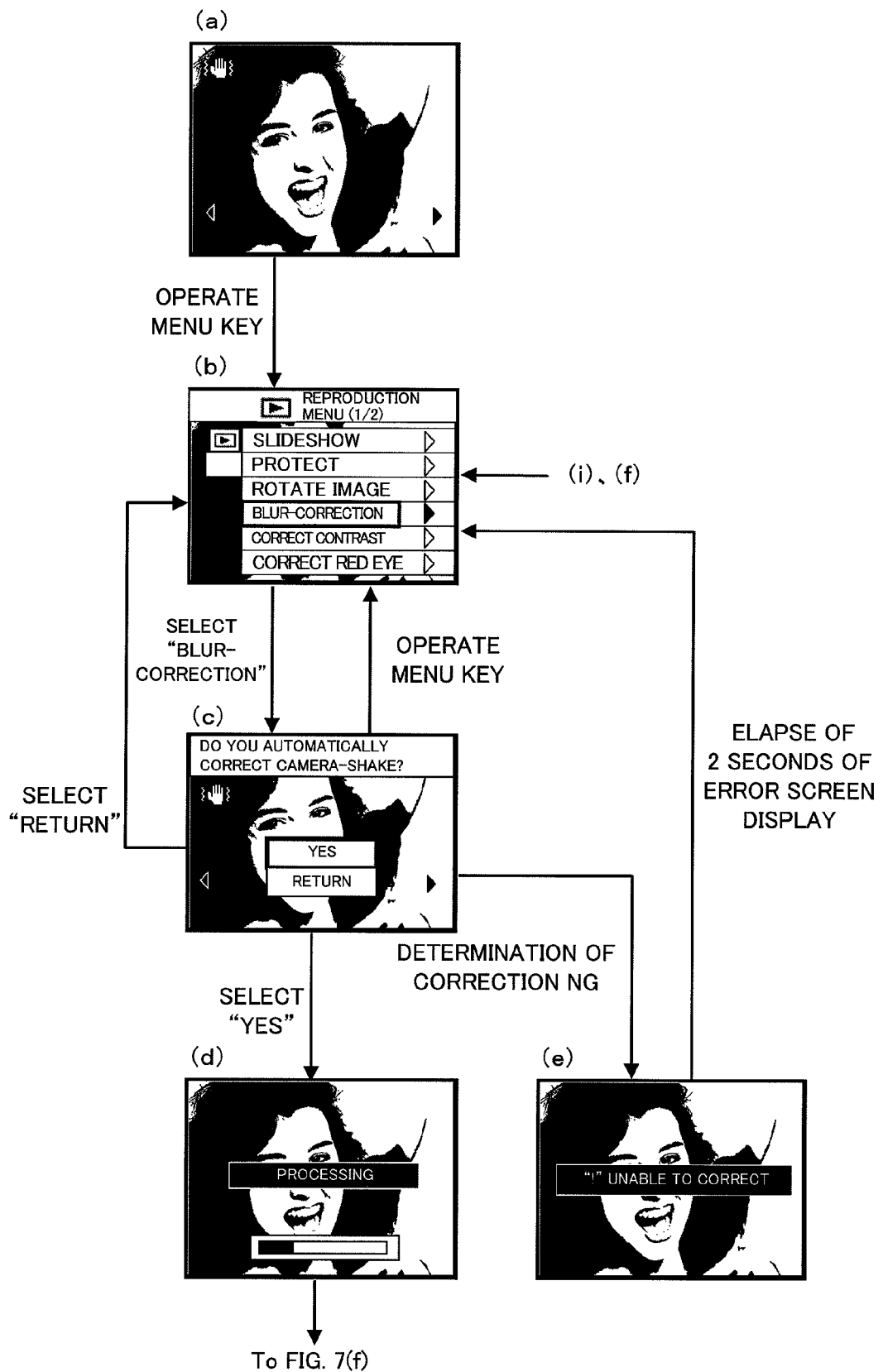
FIG. 6 is a transition diagram showing a part of a screen displayed in a display portion 126 of the digital camera 100 according to this embodiment

When a current mode is transited to the reproduction mode as a result of the operating portion 130 being operated, the main controlling portion 120 reads out the image data in an exif format from the recording medium 128, and displays a reproduced image in the display portion 126. The reproduced image is shown in FIG. 6(a). Herein, FIG. 6 is a transition diagram of a screen showing the blur-correcting process displayed in the display portion 126 in the reproduction mode. In the reproduced image shown in the FIG. 6(*a*), a camera-shake icon showing a camera-shake state in the reproduced image is displayed on the top left of the screen. This camera-shake icon is an icon according to the level of the camera shake, as shown in FIG. 5. The level of camera shake is determined according to the PSF data recorded in the tag data area.

When the menu key 130*b* is operated when the reproduced image, i.e., the image subject to correction, shown in FIG. 6(*a*) is displayed in the display portion 126, a correction menu item screen as shown in FIG. 6(*b*) with items of "slideshow", "protect", "rotate image", "blur-correction", "correct contrast", and "correct red eye" are displayed. When a cursor key 130*e* is operated and the "blur-correction" is selected from various correction menu items and a SET key 130*g* is operated, a message asking "Do you automatically correct the camera shake?" is displayed on an upper side portion of the screen, as shown in FIG. 6(*c*), and also a blur-correcting confirmation screen for allowing a user to select "Yes" or "Return" is displayed in a center portion of the screen. Herein, when "Return" is selected/determined by operating the cursor key 130*f* and the SET key 130*g*, or when a menu key 130*d* is operated, a current screen is transited to the correction menu item screen shown in FIG. 6(*b*).

Furthermore, when "Yes" is selected/determined in the blur-correcting confirmation screen in FIG. 6(*c*), the blur-correcting process is performed on the image subject to correction based on the PSF data accommodated in the tag data. Specifically, the main controlling portion 120 controls the camera-shake detecting/correcting portion 19 and iteratively executes Fourier transformation and inverse Fourier transformation. Thereby, each filter coefficient of the image restoration filter is evaluated, and the filtering process and ringing process are performed on the image subject to correction. As a result, the correction-processed image is produced (see the step S110 to the step S130 of the preceding FIG. 15). The current screen is then transited to a screen displaying "processing" and a bar showing the process progress as shown in FIG. 6(*d*).

Herein, when it is determined as a result of the PSF data being detected that the blur-correcting is not possible, the current screen is transited to an error screen displaying a message of "'!' Unable to correct" in a center portion of the screen as shown in FIG. 6(*e*), and after this error screen is displayed for two seconds, the current screen is transited to the correction menu item screen shown in FIG. 6(*b*).

Thereafter, the digital camera 100 of this embodiment has a correction-screen-display processing program that is designed to display to the user a correction-processed screen, which is after the blur-correcting process is performed on the image subject to correction, and an image subject to correction before the blur-correcting process is performed, when the screen showing the process progress shown in FIG. 6(*d*) is ended, i.e., when the blur-correcting process is ended. The digital camera executes this program. Herein, four representative process examples are mentioned. The correction-screen displaying process described below as an example 1 to an example 4 may also be combined. However, only characteristic portions of each of the processes are described.

EXAMPLE 1

Figure 7:
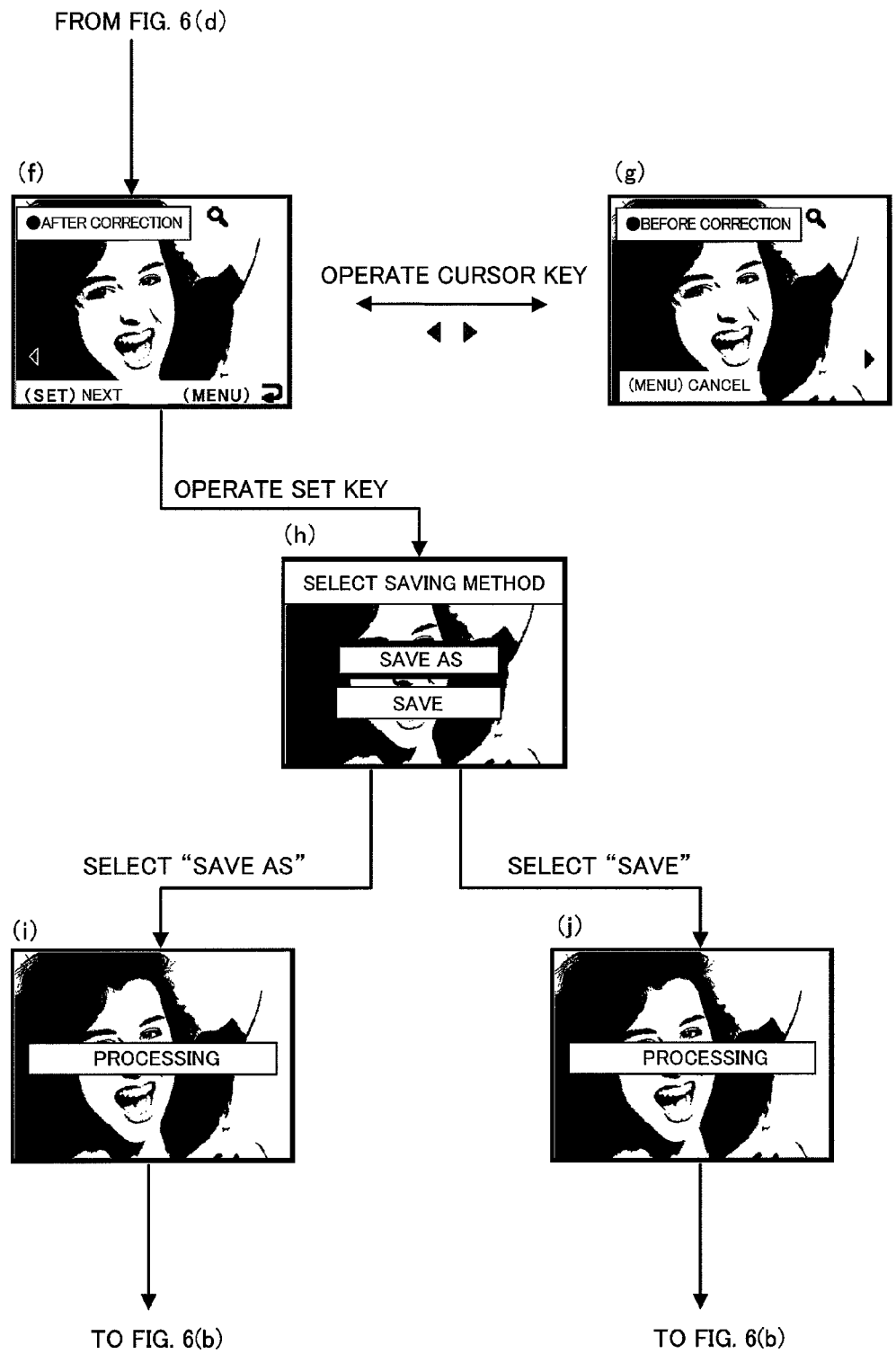
FIG. 7 is a transition diagram showing another part of the screen displayed in the display portion 126 of the digital camera 100 according to this embodiment.

The characteristic of the correction-screen displaying process in the example 1 is switching of images. Specifically, when the screen showing the process progress shown in FIG. 6(*d*), is ended, i.e., when the blur-correcting process is ended, the correction-processed image that is obtained after performing the blur-correcting process on the image subject to correction is displayed as shown in FIG. 7(*f*). When the cursor key 130*e* is operated in a right direction in a state that the correction-processed image shown in FIG. 7(*f*) is displayed, an image subject to correction before the blur-correcting process is performed, as shown in FIG. 7(*g*), is displayed. Furthermore, when the cursor key 130*e* is operated in a left direction in a state that the image subject to correction of FIG. 7(*g*) is displayed, a correction-processed image shown in FIG. 7(*f*) is displayed. When the user alternately operates the operations in the right and left directions, the user becomes able to compare the correction-processed image after the blur-correcting process is performed and the image subject to correction before the blur-correcting process is performed. Therefore, the user is able to more easily ascertain the effect of the blur-correcting process. When the menu key 130*b* is operated in a state that images shown in FIG. 7(*f*) and the FIG. 7(*g*) are displayed, the current screen is transited to the correction menu item screen shown in FIG. 6(*b*).

Furthermore, when the SET key 130*g* is operated in a state that the correction-processed image shown in FIG. 7(*f*) is displayed, the current screen is transited to a saving-method selecting screen shown in FIG. 7(*h*). In the saving-method selecting screen shown in FIG. 7(*h*), a message of "select saving method" is displayed at an upper side portion of the screen, and items of "Save As" and "Save" are displayed at a center portion of the screen that allows the user to select the items.

When the cursor key 130*e* and the SET key 130*g* are operated and "Save As" is selected/determined on the saving-method selecting screen shown in FIG. 7(*h*), the current screen is transited to a "Save As" process screen shown in FIG. 7(*i*), and a "Save As" process is executed. When "Save" is selected/determined by performing the same operation on the saving-method selecting screen shown in FIG. 7(*h*), the current screen is transited to a "Save" process screen shown in FIG. 7(*j*), and a "Save" process is executed. Then, when each of the processes is ended on the screens shown in FIGS. 7(*i*) and 7(*h*), the current screen is transited to a correction menu item screen shown in FIG. 6(*b*).

EXAMPLE 2

The correction screen process of an example 2 is a process in which a digital zoom process function is added to the correction screen process of the example 1. To be described specifically, when the screen showing the process progress, as shown in FIG. 6(*d*), is ended, i.e., when the blur-correcting process is ended, a correction-processed image that is obtained after performing the blur-correcting process on the image subject to correction shown in FIG. 7(*f*) is displayed Then, when the TELE key 130*c* is depressed by the user, the digital zoom process is performed on the correction-processed image by a predetermined zoom factor (for example, 108%, 123%, 137%, 176%, . . . , each time the key is depressed), a magnification-correction-processed image (the number of times of the TELE key 130*c* to be depressed: three times; the zoom factor: 137%) as shown in FIG. 8(*k*), for example, is displayed in the display portion 126.

When the cursor key 130*e* is depressed and operated in a right direction in a state that the magnification-correction-processed image shown in FIG. 8(*k*) is displayed, the digital zoom process is performed on an image subject to correction on which the blur-correcting process is not yet performed, according to the zoom factor (137%) similar to that in the aforementioned magnification-correction-processed image.

Then, an image subject to magnification and correction as shown in FIG. 8(*l*) is displayed. Furthermore, when the cursor key 130*e* is operated in a left direction in a state that the image subject to magnification and correction shown in FIG. 8(*l*) is displayed, a magnification-correction-processed image shown in FIG. 8(*k*) is displayed.

Furthermore, when the move key 130*h* shown in FIG. 4(*b*) is operated in a state that the magnification-correction-processed image in FIG. 8(*k*) is displayed, a center position of the magnification-correction-processed image is moved. When the cursor key 130*e* is operated in a right direction in a state that the magnification-correction-processed image, having the moved center, is displayed, a center position of the image subject to magnification and correction is moved based on a moving amount similar to the moving amount of the aforementioned magnification-correction-processed image whose center position is moved for the magnification-correction-processed image as shown in FIG. 8(*l*). The resultant image is displayed in the indicator 126.

Furthermore, when the WIDE key 130*d* is operated in a state that the magnification-correction-processed image and the image subject to magnification and correction as shown in the FIG. 8(*k*) and FIG. 8(*l*) are displayed, the zoom factor is changed in a direction for restoring to the original correction-processed image and image subject to correction, and then, the digital zoom process is performed. Also, when the SET key 130*g* is operated in a state that a magnification-correction-processed image of FIG. 8(*k*) is displayed, the current screen is transited to the saving-method selecting screen as shown in FIG. 7(*h*), described in the example 1. From this point onwards, processes similar to the image switching process and the image saving process described in the example 1 using FIG. 6 and FIG. 7 are executed.

EXAMPLE 3

The correction screen process of an example 3 is a process in which a both-screen display function is added to the correction screen process of the example 1 or the example 2. To be described specifically, when the screen showing the process progress, shown in FIG. 6(*d*), is ended, i.e., when the blur-correcting process is ended, a correction-processed image that is obtained after performing the blur-correcting process on the image subject to correction shown in FIG. 7(*f*) is displayed. Then, when the both-screen display key 130*f* is depressed, the correction-processed image on which the blur-correcting process is performed, and the image subject to correction before the blur-correcting process is performed, i.e., the image subject to correction on which the blur-correcting process is not yet performed, are displayed together side-by-side on one screen of the display portion 126, as shown in FIG. 8(*m*). Then, when the SET key 130*g* is operated in a state that both the images are displayed together side-by-side as shown in FIG. 8(*m*), the current screen is transited to the saving-method selecting screen as shown in FIG. 7(*h*) described in the example 1. From this point onwards, processes similar to the image switching process and the image saving process described in the example 1 using FIG. 6 and FIG. 7, and/or processes similar to the digital zoom process and the image saving process described in the example 2 using FIGS. 8(*k*) to 8(*l*) are executed.

EXAMPLE 4

Unlike the correction screen processes of the example 1 to the example 3, the correction screen process of an example 4 has a slide display function. To be specifically described, when the screen showing the process progress shown in FIG. 6(*d*) is ended, i.e., when the blur-correcting process is ended, firstly, as shown in FIG. 8(*n*), the image subject to correction before the blur-correcting process is performed is displayed, and with an elapse of time, the correction-processed image obtained by performing the blur-correcting process on the image subject to correction is slid in a gradual overlapping manner from a left side of the screen, as shown in FIG. 8(*o*). Then, the correction-processed image is displayed as shown in FIG. 8(*p*). Also, when the SET key 130*g* is operated in a state that the correction-processed image shown in FIG. 8(*p*) is displayed, the current screen is transited to the saving-method selecting screen as shown in FIG. 7(*h*) described in the example 1. From this point onwards, processes similar to the image switching process and the image saving process described in the example 1 using FIG. 6 and FIG. 7 are executed.

Thus, in the method for overlapping the image in a slide display, with respect to a proportion of the image subject to correction to the correction-processed image that are displayed on the screen for each elapse of time, the correction-processed image is becoming larger, and finally, the correction-processed image is displayed. Therefore, it is possible to easily confirm how the image is corrected. Also, because of a visual effect caused by the aforementioned slide display function on one screen of the display portion 126 that is housed in a limited space provided in the digital camera 100 as in this embodiment the usability for a user is further improved.

Next, a procedure of the blur-correcting process B in the aforementioned reproduction mode is described in detail using a flowchart shown in the FIG. 9 to FIG. 13. The procedure of the blur-correcting process B is executed by the main controlling portion 120.

Figure 9:
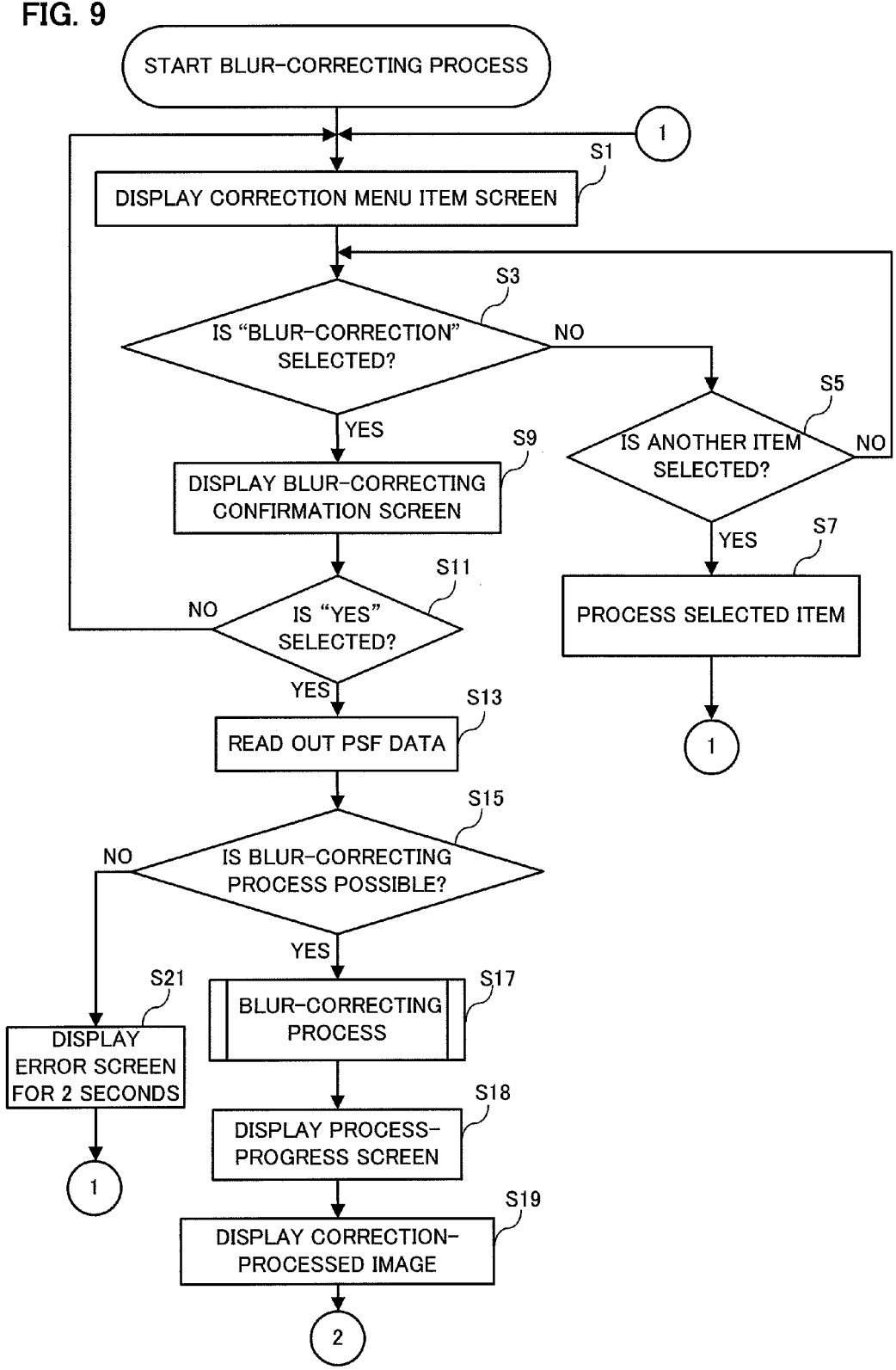
FIG. 9 is a flowchart showing a part of a procedure of a correction screen process along with a blur-correcting process of the digital camera 100 according to this embodiment.
Figure 10:
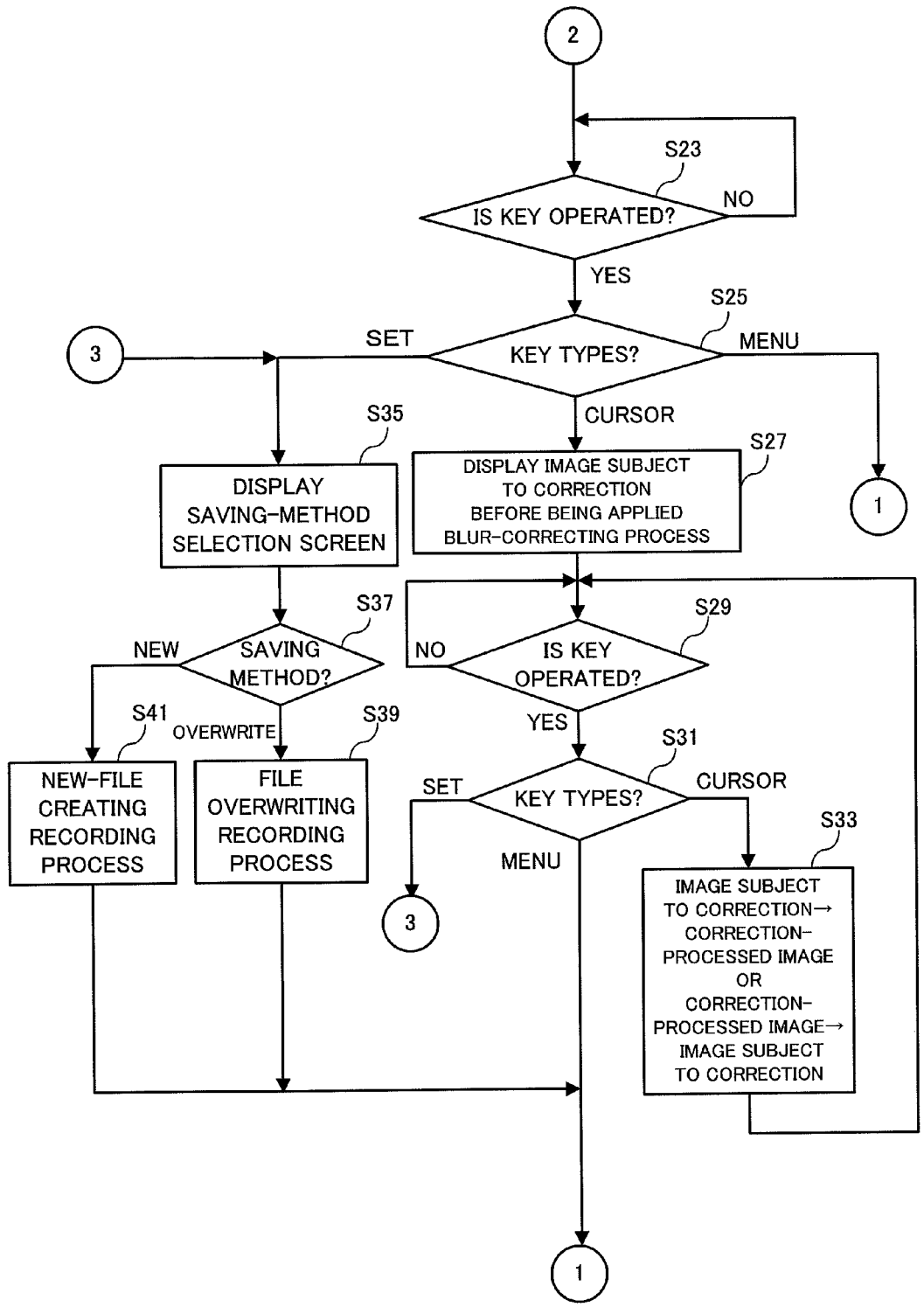
FIG. 10 is a flowchart showing another part of the procedure of the correction screen process along with the blur-correcting process of the digital camera 100 according to this embodiment.

Firstly, a procedure of the aforementioned correction screen process is described based on the flowchart of FIG. 9 and FIG. 10.

When the menu key 130*b* is operated when a reproduced image, i.e., the image subject to correction, shown in FIG. 6(*a*) is displayed in the display portion 126, the main controlling portion 120 displays the correction menu items screen shown in FIG. 6(*b*) in the display portion 126. Next, the process proceeds to a step S3 so as to determine whether or not "blur-correction" is selected from the correction menu items. When No is determined in the step S3, the process proceeds to a step S5 so as to determine whether or not an item other than "blur-correcting" is selected. When YES is determined, the process proceeds to a step S7. In the step S7, a process of the selected item is executed, and then, the process returns to the step S1. Furthermore, when NO is determined in the step S5, the process returns to the step S3 so as to repeat branching between the step S3 and the step S5 until any one item is selected from the correction menu items.

When YES is determined in the step S3, the process proceeds to a step S9 so as to display the blur-correcting confirmation screen shown in FIG. 6(*c*). Then, the process proceeds to a step S11 so as to determine whether or not "Yes", which is an item displayed on the blur-correcting confirmation screen, is selected. When NO is determined, the process returns to the step S1, and when YES is determined, the process proceeds to a step S13.

In the step S13, the PSF data is read out from the image data of the image currently reproduced, and then, the process proceeds to a step S15 so as to determine based on the corresponding PSF data whether or not it is possible to execute the blur-correcting process on the current reproduced image. When NO is determined in the step S15, the process proceeds to a step S21 so as to display the error screen shown in FIG.

6(*e*) in the indicator 126 for two seconds. Then, the process returns to the step S1. When YES is determined in the step S15, the process proceeds to a step S17 so as to control the camera-shake detecting/correcting portion 19 so that the Fourier transformation and the inverse Fourier transformation are iteratively executed. In this way, each filter coefficient of the image restoration filter is evaluated. The filtering process and the ringing process are performed on the image subject to correction. Thereby, the correction-processed image is produced (see the step S110 to the step S130 in the preceding FIG. 15). Then, the process proceeds to a step S18 so as to display the process-progress screen shown in FIG. 6(*d*).

Incidentally, as described above, the digital camera 100 of this embodiment has a correction-screen processing program that is designed to display to the user a correction-processed screen after the blur-correcting process is performed on the image subject to correction and an image subject to correction before the blur-correcting process is performed, when the screen showing the process progress shown in FIG. 6(*d*) is ended, i.e., when the blur-correcting process is ended. The example 1 to the example 4 are described as an example for these.

Firstly, a procedure of the main controlling portion 120 according to the implementation example of the example 1 is described.

When the process of the step S18 is ended, the process proceeds to a step S19 so as to display the correction-processed image shown in FIG. 7(*f*). Next, the process proceeds to a step S23 so as to determine whether or not any key in the operating portion 130 is operated. The determination is repeatedly performed until YES is determined in the step S23. When YES is determined, the process proceeds to a step S25. In the step S25, it is determined whether the operated key is any one of the menu key 130*b*, the cursor key 130*e*, and the SET key 130*g*. As other keys, the operating portion 130 is provided with the release key 130*a*, the menu key 130*b*, the TELE key 130*c*, the WIDE key 130*d*, the both-screen display key 130*f*, and the move key 130*h*. For the illustration purposes in the implementation example of the example 1, a process by the detection of these keys is not described.

In the step S25, when it is determined that the operated key is the menu key 130*b*, the process returns to the step S1. In the step S25, when it is determined that the operated key is the cursor key 130*e*, the process proceeds to a step S27 so as to display the image subject to correction before the blur-correcting process is performed. Then, the process proceeds to a step S29 so as to determine whether any key within the operating portion 130 is operated. The process repeatedly performs the determination until YES is determined in the step S29, and when YES is determined, the process proceeds to a step S31. In the step S25, it is determined whether the operated key is any one of the menu key 130*b*, the cursor key 130*e*, and the SET key 130*g*.

When it is determined in the step S31 that the operated key is the cursor key 130*e*, the process proceeds to a step S33. In the step S33, when the image currently displayed in the display portion 126 is the image subject to correction, the process displays the correction-processed image, and when the currently displayed image is the correction-processed image, the process displays the image subject to correction, and then, the process returns to the step S29.

When it is determined in the step S31 that the operated key is the menu key 130*b*, the process returns to the step S1. When it is determined in the step S31 that the operated key is the SET key 130*b*, the process proceeds to a step S35. Furthermore, when it is determined in the step S25 that the operated key is the SET key 130*b*, the process proceeds to a step S35.

In the step S35, the saving-method selecting screen shown in FIG. 7(*h*) is displayed, and then, the process proceeds to a step S37 so as to determine which of the items, i.e., "Save As" or "Save", is selected from the items displayed on corresponding screen. In the step S37, when it is determined that "Save" is selected, the process proceeds to a step S39 so as to perform the overwriting process on a file of the currently displayed image data and to record the overwritten file on the recording medium 128. In the step S37, when it is determined that "Save As" is selected, the process proceeds to a step S41 so as to perform a process for saving as a new file different from the file of the currently displayed image data, and the process records the new file on the recording medium 128. After the processes in the step S39 and the step S41, the process returns to the step S1.

Figure 11:
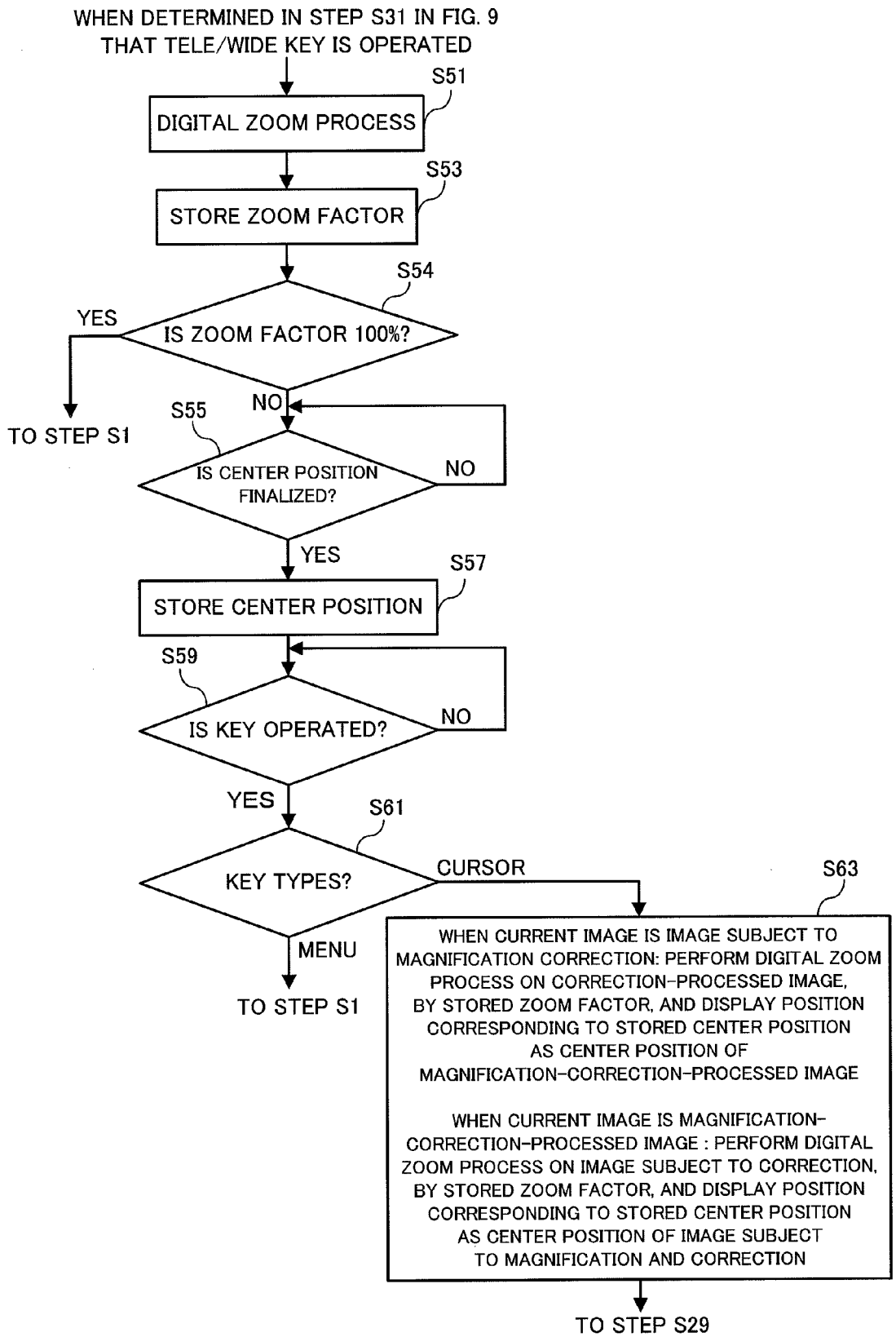
FIG. 11 is a flowchart showing still another part of the procedure of the correction screen process along with the blur-correcting process of the digital camera 100 according to this embodiment.
Figure 12:
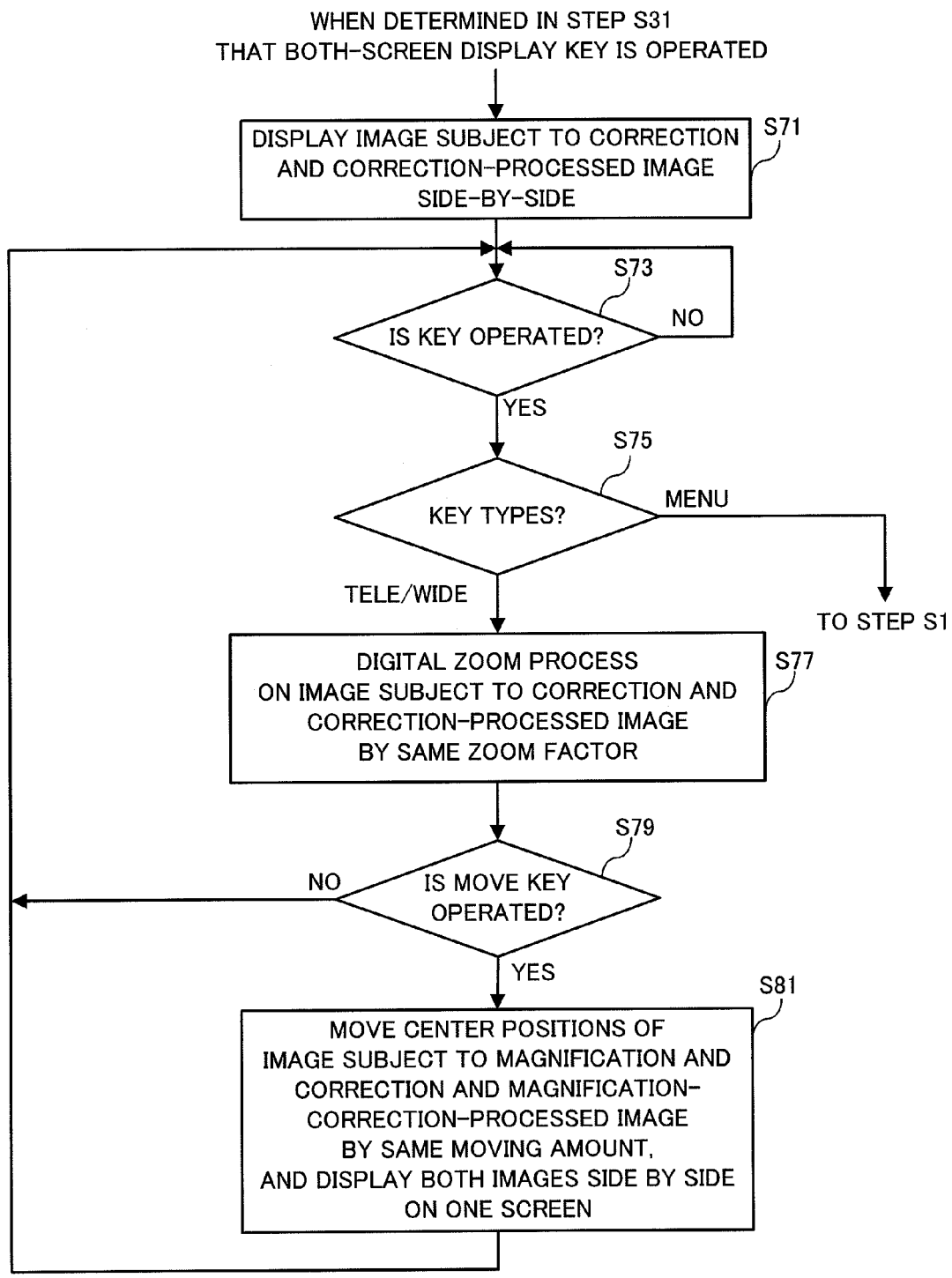
FIG. 12 is a flowchart showing yet still another part of the procedure of the correction screen process along with the blur-correcting process of the digital camera 100 according to this embodiment.

Next a procedure in the aforementioned example 2 is described using FIG. 9 to FIG. 11.

In the example 2, the digital zoom process is added to the process of the example 1. Specifically, in the description for the example 1, it is determined in the step S29 whether any one of keys within the operating portion 130 is operated. Also, the TELE key 130*c* or the WIDE key 130*d* is included in types of keys to be determined in the step S31 which is noticed when YES is determined in the step S29. Herein, when the main controlling portion 120 determines that the operated key is the TELE key 130*c* or the WIDE key 130*d*, the process executes a routine of FIG. 11.

In a step S51, the digital zoom process is performed on the correction-processed image by a zoom factor according to the operated key (the TELE key 130*c* or the WIDE key 130*d*), and a magnification-correction-processed image is produced. Then, the process proceeds to a step S53 where the zoom factor is stored in the internal memory 124, and then, the process proceeds to a step S54.

In the step S54, it is determined whether or not the zoom factor of the image currently displayed in the display portion 126 is 100%. When YES is determined in the step S54, the process proceeds to the step S1 in FIG. 9, and when NO is determined, the process proceeds to a step S55. In the procedure from the step S1 onwards, a procedure similar to that in the example 1 is executed. In the step S55, it is determined whether or not the center position of the magnification-correction-processed image is finalized as a result of the move key 130*h* being operated. In the step S45, the determination is repeatedly performed until YES is determined. When YES is determined, the process proceeds to a step S57 where the center position is stored in the internal memory 124.

Next, the process proceeds to a step S59 so as to determine whether any one of the keys within the operating portion 130 is operated. The determination is reedy performed until YES is determined in the step S59. When YES is determined, the process proceeds to a step S61. In the step S61, it is determined whether the operated key is the menu key 130*b* or the cursor key 130*e*. In the step S61, when it is determined that the operated key is the menu key 130*b*, the process proceeds to the step S1 in FIG. 9. From the step S1 onwards, a process similar to that in the example 1 is executed.

Furthermore, in the step S61, when it is determined that the operated key is the cursor key 130*e*, the process proceeds to a step S63, and when the image currently displayed in the display portion 126 is the image subject to magnification and correction, the process performs the digital zoom process on the correction-processed image by the zoom factor stored in the internal memory 124 so as to produce the magnification-correction-processed image, and also causes the display portion 126 to display the position corresponding to the stored center position as the center position of the magnificationcorrection-processed image. Furthermore, when the currently displayed image is the magnification-correction-processed image, the process performs the digital zoom process on the image subject to correction by the zoom factor stored in the internal memory 124 so as to produce the image subject to magnification and correction, and also, causes the display portion 126 to display the position corresponding to the stored center position as the center position of the image subject to magnification and correction. Then, the process proceeds to a step S29, and after the step S29 onwards, processes similar to those in the example 1 are executed.

Next, a procedure in the aforementioned example 3 is described using FIG. 9 to FIG. 12.

As described above, in the example 3, the both-screen displaying process is added to the correction screen process in the example 1 or the example 2. Specifically, in the description for the example 1, it is determined in the step S29 whether any one of keys within the operating portion 130 is operated. Also, the both-screen display key 130f is included in types of keys to be determined in the step S31 which is noticed when YES is determined in the step S29. Herein, when the main controlling portion 120 determines that the operated key is the both-screen display key 130f, the process executes a routine in FIG. 12.

In a step S71, as shown in FIG. 8(m), an image before and after correction in which the image subject to correction and the correction-processed image are displayed together side-by-side is displayed on one screen of the display portion 126. Next, the process proceeds to a step S73 so as to determine whether or not any one of keys in the operating portion 130 is operated. The process repeatedly performs the determination until YES is determined in the step S73, and when YES is determined, the process proceeds to the step S75. In the step S75, it is determined whether the operated key is the menu key 130e or the TELE key 130c/WIDE key 130d. In the step S75, when it is determined that the operated key is the menu key 130e, the process proceeds to the step S1 shown in FIG. 9, and after the step S1 onwards, processes similar to those in the example 1 are executed.

In the step S75, when it is determined that either the TELE key 130c or the WIDE key 130d is operated, the process proceeds to a step S77 so as to perform each digital zoom process on the image subject to correction and the correction-processed image by a zoom factor according to the depressed key (the TELE key 130c or the WIDE key 130d). As a result, the image subject to magnification and correction and the magnification-correction-processed image are produced, and an image before and after a magnification correction in which the both images are displayed together side-by-side is displayed on one screen of the display portion 126.

Then, the process proceeds to a step S79 so as to determine whether or not the move key 130h is operated. When NO is determined in the step S79, the process returns to the step S73, and when YES is determined, the process proceeds to a step S81. In the step S81, according to the operation of the move key 130h, the center positions of the image subject to magnification and correction and the magnification-correction-processed image are moved by the same moving amount. Both the images are displayed together side-by-side on one screen. Then, the process returns to the step S73.

Figure 13:
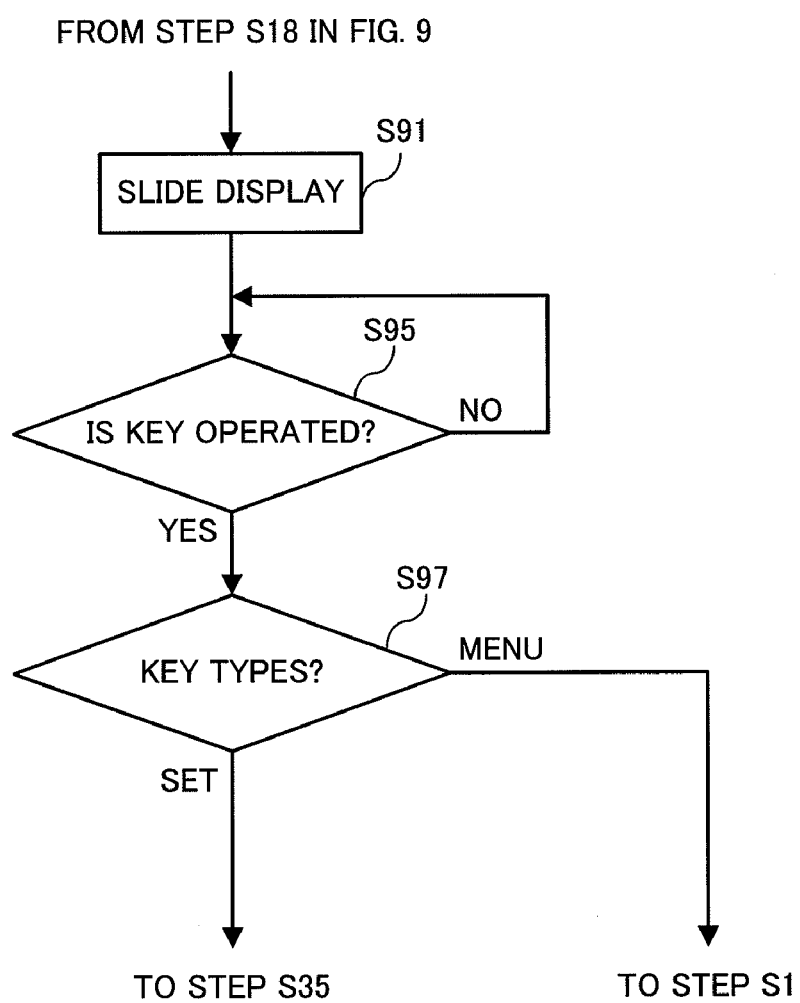
FIG. 13 is a flowchart showing yet still another part of the procedure of the correction screen process along with the blur-correcting process of the digital camera 100 according to this embodiment.

Next, a procedure in the aforementioned example 4 is described using FIG. 9, FIG. 10, and FIG. 13. As described above, the example 4 differs in a method for comparing and displaying the image subject to correction and the correction-processed image from the examples 1 to 3, and employs a method in which the images are slid and displayed. Therefore, a procedure shown in a step S91 to a step S97 of the flowchart in FIG. 13 described below replaces the step S19 to the step S33 in FIG. 9 and FIG. 10 described in the example 1. That is, the main controlling portion 120 executes the procedure shown in FIG. 13 described below and the step S1 to the step S41 excluding the step S25 to the step S33 shown in the FIG. 9 and FIG. 10.

Specifically, after displaying the screen showing the process progress in the step S18 shown in FIG. 9, the process proceeds to a step S91, and firstly, as shown in FIG. 8(n), the image subject to correction before the blur-correcting process is performed is displayed, and with an elapse of time, the correction-processed image, on which the blur-correcting process is performed on the image subject to correction, is slid and displayed in a gradual overlapping manner from the left side of the screen, as shown in FIG. 8(c). Finally, only the correction-processed image is displayed in the display portion 126. Then, the process proceeds to a step S95 so as to determine whether any one of the keys within the operating portion 130 is operated. The determination is repeatedly performed until YES is determined in the step S95. When YES is determined, the process proceeds to a step S97. In the step S97, it is determined whether the operated key is the menu key 130e, or the SET key 130g. When it is determined that the operated key is the menu key 130e, the process proceeds to the step S1 shown in FIG. 9, and when it is determined that the operated key is the SET key 130g, the process proceeds to the step S35. Processes from this point onwards are similar to those in the example 1.

Thus, in the embodiment, regarding the image obtained before performing the correcting process on the image subject to correction and the image on which the correcting process is already performed, the screen switching is performed by the operation of the cursor key 130e and the both-screen display is performed by the operation of the both-screen display key 130f. Thus, the user is able to compare the image before the correcting process and the image after the correcting process with a simple operation.

It is noted that in the example 4 of the screen comparing process according to this embodiment, the slide display is performed after the display of the screen showing the process progress. However, the operating portion 130 may be further provided with a slide key, and when depressing the slide key is performed, the slide display may be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An imaging apparatus, comprising:
   an imager which takes an optical image of an object so as to produce an image signal;
   a detector which detects an image blurring amount based on blurring included in the image signal;
   an image blurring corrector which performs an image-blurring correcting process on the image signal based on the image blurring amount so as to produce a corrected image signal;
   a first display controller which causes a displayer to display an image based on the image signal;
   a second display controller which causes said displayer to display an image based on the corrected image signal; and
   a switcher which switches an image display by said first display controller and an image display by said second display controller and said imaging apparatus further comprising:

a determiner which determines whether or not the image blurring amount exceeds a threshold value; and
an image-blurring correction prohibiter which prohibits the image-blurring correcting process when it is determined in said determiner that the image blurring amount exceeds the threshold value.

2. An imaging apparatus according to claim 1, further comprising a third display controller which causes said displayer to display a warning indicating prohibition of the image-blurring correcting process by said image-blurring correction prohibiter.

3. An imaging apparatus, comprising:
an imager which takes an optical image of an object so as to produce an image signal;
a detector which detects an image blurring amount based on blurring included in the image signal;
an image blurring corrector which performs an image-blurring correcting process on the image signal based on the image blurring amount so as to produce a corrected image signal;
a first display controller which causes a displayer to display an image based on the image signal;
a second display controller which causes said displayer to display an image based on the corrected image signal; and
a switcher which switches an image display by said first display controller and an image display by said second display controller and said imaging apparatus further comprising:
a recorder which records a plurality of still images, the image signal being corresponding to one frame of the still image; and
a selector which selectively selects one still image from among the plurality of still images, wherein said image-blurring corrector performs the image blurring correction on the still image selected by said selector.

4. An imaging apparatus according to claim 3, wherein selection by said selector is performed by operating said operation key based on a selection screen display, and display of a warning signal by said third display controller to said displayer is ended after a predetermined time from a start of the display of the warning signal, and the selection display screen is displayed in the displayer.

5. An imaging apparatus, comprising:
an imager which takes an optical image of an object so as to produce an image signal;
a detector which detects an image blurring amount based on blurring included in the image signal;
an image blurring corrector which performs an image-blurring correcting process on the image signal based on the image blurring amount so as to produce a corrected image signal;
a first display controller which causes a displayer to display an image based on the image signal;
a second display controller which causes said displayer to display an image based on the corrected image signal; and
a switcher which switches an image display by said first display controller and an image display by said second display controller and said imaging apparatus further comprising:
a fourth display controller which causes said displayer to display a first magnified image obtained by performing a magnifying process on the image signal so that a predetermined portion of an image based on the image signal is magnified by a predetermined magnification factor; and
a fifth display controller which causes said displayer to display a second magnified image obtained by performing a magnifying process on the corrected image signal so that a portion corresponding to the predetermined portion within an image based on the corrected image signal is magnified by the predetermined magnification factor.

6. An imaging apparatus, comprising:
an imager which takes an optical image of an object so as to produce an image signal;
a detector which detects an image blurring amount based on blurring included in the image signal;
an image blurring corrector which performs an image-blurring correcting process on the image signal based on the image blurring amount so as to produce a corrected image signal;
a first display controller which causes a displayer to display an image based on the image signal;
a second display controller which causes said displayer to display an image based on the corrected image signal; and
a switcher which switches an image display by said first display controller and an image display by said second display controller and said imaging apparatus further comprising:
a memory which records an image based on the image signal;
a first recording controller which overwrites and records the image based on the corrected image signal over the image based on the image signal recorded in said memory;
a second recording controller which records the image based on the corrected image signal in said memory; and
a selector which selects said first recording controller and said second recording controller.

* * * * *